US006797945B2

(12) United States Patent
Berggren et al.

(10) Patent No.: US 6,797,945 B2
(45) Date of Patent: Sep. 28, 2004

(54) PIEZOELECTRIC CHARGED DROPLET SOURCE

(75) Inventors: William Travis Berggren, Madison, WI (US); Michael Scott Westphall, Fitchburg, WI (US); Mark Andrew Scalf, Oakland, CA (US); Lloyd Michael Smith, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 89 days.

(21) Appl. No.: 10/113,956

(22) Filed: Mar. 29, 2002

(65) Prior Publication Data

US 2002/0158196 A1 Oct. 31, 2002

Related U.S. Application Data

(60) Provisional application No. 60/280,632, filed on Mar. 29, 2001.

(51) Int. Cl.[7] .......................... B01D 54/44; H01J 49/00
(52) U.S. Cl. ........................ 250/288; 250/286; 422/100
(58) Field of Search ................................ 250/288, 286; 422/100

(56) References Cited

U.S. PATENT DOCUMENTS

| | | | | |
|---|---|---|---|---|
| 3,683,212 A | | 8/1972 | Zoltan | 310/8.3 |
| 3,857,049 A | | 12/1974 | Zoltan | 310/8.1 |
| 4,352,570 A | | 10/1982 | Firth | 366/127 |
| 4,461,155 A | | 7/1984 | Werjefelt | 62/93 |
| 4,492,322 A | | 1/1985 | Hieftje et al. | 222/420 |
| 4,546,253 A | | 10/1985 | Tsuchiya et al. | 250/288 |
| 4,579,279 A | * | 4/1986 | Marchant | 239/3 |
| 4,580,148 A | | 4/1986 | Domoto et al. | 347/63 |
| 4,735,364 A | * | 4/1988 | Marchant | 239/690.1 |
| 4,845,512 A | * | 7/1989 | Arway | 347/77 |
| 4,924,097 A | * | 5/1990 | Browner et al. | 250/343 |
| 4,935,624 A | * | 6/1990 | Henion et al. | 250/288 |
| 5,073,713 A | | 12/1991 | Smith et al. | 250/282 |
| 5,076,097 A | | 12/1991 | Zarrin et al. | 73/61.1 |

(List continued on next page.)

FOREIGN PATENT DOCUMENTS

| | | | |
|---|---|---|---|
| WO | WO 00/17908 | 3/2000 | H01J/49/04 |

OTHER PUBLICATIONS

Allison, E.E. and Kendall, B.R.F. (Nov. 1996), "Cubic electrodynamic levitation.trap with transparent electrodes," *Rev. Sci. Instrum.* 67(11):3806–3812.

(List continued on next page.)

*Primary Examiner*—John R. Lee
*Assistant Examiner*—Kalimah Fernandez
(74) *Attorney, Agent, or Firm*—Greenlee, Winner and Sullivan, P.C.

(57) ABSTRACT

The invention provides devices, device configurations and methods for improved sensitivity, detection level and efficiency in mass spectrometry particularly as applied to biological molecules, including biological polymers, such as proteins and nucleic acids. Specifically, the invention relates to charged droplet sources and their use as ion sources and as components in ion sources. In addition, devices of this invention allow mass spectral analysis of a single charged droplet. Further, the charged droplet sources and ion sources of this invention can be combined with any charge particle detector or mass analyzer, but are a particularly benefit when used in combination with a time of flight mass spectrometer.

53 Claims, 11 Drawing Sheets

U.S. PATENT DOCUMENTS

| | | | | | |
|---|---|---|---|---|---|
| 5,192,865 | A | | 3/1993 | Zhu | 250/288 |
| 5,247,842 | A | | 9/1993 | Kaufman et al. | 73/865.5 |
| RE34,757 | E | * | 10/1994 | Smith et al. | 204/452 |
| 5,403,617 | A | | 4/1995 | Haaland | 427/180 |
| 5,504,327 | A | | 4/1996 | Sproch et al. | 250/288 |
| 5,560,543 | A | * | 10/1996 | Smith et al. | 239/102.2 |
| 5,565,677 | A | | 10/1996 | Wexler et al. | 250/251 |
| 5,611,846 | A | | 3/1997 | Overton et al. | 96/102 |
| 5,614,711 | A | | 3/1997 | Li et al. | 250/287 |
| 5,750,988 | A | | 5/1998 | Apffel et al. | 250/288 |
| 5,767,512 | A | | 6/1998 | Eiden et al. | 250/282 |
| 5,838,002 | A | | 11/1998 | Sheehan | 250/288 |
| 5,873,523 | A | | 2/1999 | Gomez et al. | 239/3 |
| 5,894,841 | A | | 4/1999 | Voges | 128/203.12 |
| 5,922,976 | A | | 7/1999 | Russell et al. | 73/865.5 |
| 5,925,732 | A | | 7/1999 | Ecker et al. | 530/334 |
| 5,945,678 | A | | 8/1999 | Yanagisawa | 250/423 |
| 5,965,883 | A | * | 10/1999 | Lee et al. | 250/288 |
| 5,973,904 | A | | 10/1999 | Pui et al. | 361/225 |
| 5,992,244 | A | | 11/1999 | Pui et al. | 73/865.5 |
| 6,001,309 | A | * | 12/1999 | Gamble et al. | 422/100 |
| 6,027,699 | A | | 2/2000 | Holcomb et al. | 422/186.04 |
| 6,051,189 | A | | 4/2000 | Wick et al. | 422/82.01 |
| 6,093,557 | A | | 7/2000 | Pui et al. | 435/173.1 |
| 6,207,954 | B1 | * | 3/2001 | Andrien et al. | 250/288 |
| 6,277,334 | B1 | | 8/2001 | Ecker et al. | 422/131 |
| 6,278,111 | B1 | | 8/2001 | Sheehan et al. | 250/288 |
| 6,331,702 | B1 | | 12/2001 | Krutchinsky et al. | 250/281 |
| 6,359,275 | B1 | * | 3/2002 | Bertsch et al. | 250/281 |
| 2001/0028866 | A1 | | 10/2001 | Ecker et al. | 422/131 |
| 2001/0030285 | A1 | | 10/2001 | Miller et al. | 250/288 |
| 2001/0035494 | A1 | | 11/2001 | Scalf et al. | 250/288 |
| 2002/0011562 | A1 | | 1/2002 | Park | 250/288 |
| 2002/0125423 | A1 | | 9/2002 | Ebeling et al. | 250/288 |
| 2002/0166961 | A1 | | 11/2002 | Berggren et al. | 250/288 |

OTHER PUBLICATIONS

Chen, D.R. et al. (1995), "Electrospraying of conducting liquids for monodisperse aerosol generation in the 4nm to 1.8 μm diameter range," *J. Aerosol. Sci*. 26:963–977.

Cheng, X. et al. (Feb. 1995), "Charge state reduction of oligonucleotide negative ions from electrospray ionization," *Anal. Chem*. 67(3):586–593.

Cooper, D.W. and Reist, P.C. (Oct. 1973), "Neutralizing charged aerosols with radioactive sources," *J. Colloid and Interface Sci*. 45:17–26.

Dahneke, B. and Flachsbart, H. (1972), "An aerosol beam spectrometer," *Aerosol Sci*. 3:345–349.

Feng, X. and Agnes, G.R. (May 2000), "Single isolated droplets with net charge as a source of ions," *Amer. Soc. Mass Spec*. 11:393–399.

Fenn, J.B. et al. (Oct. 1989), "Electrospray ionization for mass spectrometry of large biomolecules," *Science* 246:64–71.

Fenn, J.B. et al. (1990), "Electrospray ionization—principles and practice," *Mass. Spec. Rev*. 9:37–70.

Galley, P.J. and Hieftje, G.M. (1992), "Technique for producing capillaries with reproducible orifice diameters for uniform droplet generation," *Applied Spectroscopy* 46(10):1460–1463.

Georghiou, G.E. et al. (1999), "Characterization of point–plane corona in air at radio frequency using a FE–FCT method," *J. Phys. D: Appl. Phys*. 32:2204–2218.

Griffey, R.H. et al. (1997), "Oligonucleotide charge states in negative ionization Electrospray–mass spectrometry are a function of solution ammonium ion concentration," *J. Am. Soc. Mass Spectrometry* 8:155–160.

Hager, D.B. et al. (Nov. 1994), "Droplet electrospray mass spectrometry,"*Anal. Chem*. 66(22):3944–3949.

He, L. and Murray, K. (1999), "337 nm Matrix–assisted Laser Desorption/Ionization of Single Aerosol Particles," *J. Mass Spectrom.*, 34:909–914.

Huang, E.C. et al. (Jul. 1990), "Atmospheric pressure ionization mass spectrometry," *Anal. Chem*. 62(13):713A–725A.

Karas et al., (1988), "Laser desorption ionization of proteins with molecular masses exceeding 10,000 daltons," *Anal. Chem*. 60:2299–2306.

Karas et al. (1987), "Matrix–assisted ultraviolet laser desorption of non–volatile compounds," *Int. J. Mass Spectrometry, Ion Proc.*, 78:53–68.

Kaufman, S.L. et al. (Jun. 1996), "Macromolecule analysis based on electrophoretic mobility in air: globular proteins," *Anal. Chem*. 68:3703.

Kaufman, S.L. et al. (Jun. 1996), "Macromolecule analysis based on electrophoretic mobility in air: globular proteins," *Anal. Chem*. 68:1895–1904.

Kaufman, S.L. (1997), "TSI working prototype GEMMA* macromolecule analyzer," *TSI IncorporatedAdvanced Technology Group*.

Kaufman, S.L. (1998), "Analysis of biomolecules using electrospray and nanoparticle methods: the gas–phase electrophoretic mobility molecular analyzer (GEMMA)," *J. Aerosol. Sci*. 29(5,6):537–552.

Kaufman, S.L. et al. (1998), "Analysis of a 3.6–MDa hexagonal bilayer hemoglobin from *Lumbricus terrestris* using a gas–phase electrophoretic mobility molecular analyzer," *Anal. Biochem*. 259:195–202.

Kaufman, S.L. (Feb. 2000), "Electrospray diagnostics performed by using sucrose and proteins in the gas–phase electrophoretic mobility molecular analyzer (GEMMA)," *Anal. Chim. Acta* 406:3–10.

Kim, T. et al. (May 2000), "Design and implementation of a new electrodynamic ion funnel," *Anal. Chem*. 72(10):2247–2255.

Kim, T. et al. (Oct. 2000), "Improved ion transmission from atmospheric pressure to high vacuum using a multicapillary inlet and electrodynamic ion funnel interface,"*Anal. Chem*. 72(20):5014–5019.

Kung, C–y et al. (Mar. 1999), "Single–molecule analysis of ultradilute solutions with guided streams of 1–μm water droplets," *Applied Optics* 38(9):1481–1487.

Limbach, P.A., (1996), "Indirect mass spectrometric methods for characterizing and sequencing oligonucleotides," *Mass Spectrometry Reviews* 15:297–336.

Liu, P. et al. (1995), "Generating particle beams of controlled dimensions and divergence: II. Experimental evaluation of particle motion in aerodynamic lenses and nozzle expansions," *Aerosol Sci. and Tech*. 22:314–324.

Liu, P. et al. (1995), "Generating particle beams of controlled dimensions and divergence: I. Theory of particle motion in aerodynamic lenses and nozzle expansions," *Aerosol Sci. and Tech*. 22:293–313.

Luginbuhl, Ph. et al. (May 2000), "Femtoliter injector for DNA mass spectrometry," *Sensors and Actuators B* 63:167–177.

Mann, M. et al. (1989), "Interpreting mass spectra of multiply charged ions," *Anal. Chem.* 61:1702–1708

McLuckey, S.A. et al. (Mar. 1998), "Ion/Ion proton–transfer kinetics: implications for analysis of ions derived from electrospray of protein mixtures" *Anal. Chem.* 70:1198–1202.

Miliotis, T. et al. (Mar. 2000), "Capillary liquid chromatography interfaced to matrix–assisted laser desorption/ionization time–of–flight mass spectrometry using an on–line coupled piezoelectric flow–through microdispenser," *J. Mass Spectrometry* 35:369–377.

Mouradian, S. (Jan. 1998) "Separation and Detection of Nucleic Acids," Ph.D. Thesis, Chemistry, University of Wisconsin–Madison.

Mouradian, S. et al. (Mar. 1997), "DNA analysis using an electrospray scanning mobility particle sizer," *Anal. Chem.* 69:919–925.

Ogorzalek et al. (1992), "A new approach for the study of gas–phase ion–ion reactions using electrospray ionization," *J. Am. Soc. Mass Spectrometry* 3:695–705.

Sarkissian, S.N. et al. (Oct. 2000), "Measurement of phenyllactate, phenylacetate, and phenylpyruvate by negative ion chemical ionization–gas chromatography/mass spectrometry in brain of mouse genetic models of phenylketonuria and non–phenylketonuria hyperphenylalaninemia," *Anal. Biochem.* 280:242–249.

Scalf, M. et al. (Jan. 2000), "Charge reduction electrospray mass spectrometry," *Anal. Chem.* 72:52–60.

Scalf, M. et al. (Jan. 1999), "Controlling charge states of large ions," *Science* 28(3):194–197.

Shaw, R.A. et al. (Oct. 1999), "An electrodynamic levitation system for studying individual cloud particles under upper–tropospheric conditions," *J. Atmospheric and Oceanic Tech.* 17(7):940–948.

Smith, L.M. (Sep. 1996), "Sequence from spectrometry: a realistic prospect?", *Nature Biotechnology* 14:1064–1065.

Smith, R.D. et al. (May 1990), "New Developments in biochemical mass spectrometry: electrospray ionization," *Anal. Chem.* 62:882–899.

Smith et al. (1991), "Principles and practice of electrospray ionization–mass spectrometry for large polypeptides and proteins," *Mass Spectrometry Rev.* 10:359–451.

Stephenson, J.L. and McLuckey, S.A. (Nov. 1996), "Ion/Ion proton transfer reactions for protein mixture analysis," *Anal. Chem.* 68:4026–4032.

Stephenson, J.L. and McLuckey, S.A. (Sep. 1998), "Simplification of product ion spectra derived from multiply charged parent ions via ion/ion chemistry," *Anal. Chem.* 70:4026–4032.

Stephenson, J.L. and McLuckey, S.A. (Sep. 1998), "Charge manipulation for improved mass determination of high–mass species and mixture components by electrospray mass spectrometry," *J. Mass Spectrometry* 33:664–672.

Switzer, G.L. (Nov. 1991), "A versatile system for stable generation of uniform droplets," *Rev. Sci. Instrum.* 62(11):2765–2771.

TSI Incorporated, Particle Instrument Division (1999), "GEMMA* method for macromolecule/nanoparticle analysis," online, retrieved on May 13, 2000 from <http://www.tsi.com/particle/product/gemma/gemma.html>.

TSI Incorporated Particle Instruments (1998), "Model 3480 electrospray aerosol generator".

TSI Incorporated Particle Instruments (1999), "Model 3800 aerosol time–of–flight mass spectrometer".

Wang, H. and Hackett, M. (Jan. 1998), "Ionization within a cylindrical capacitor: electrospray without an externally applied high voltage," *Anal. Chem.* 70(2):205–212.

Ebeling, D. (Mar. 9, 2000) "Development of Corona Discharge Charge Reduction Dlectrospray Mass Spectrometry for Analysis of DNA Sequencing Reactions" Research Proposal, University of Wisconsin–Madison, 15pp.

* cited by examiner

2000 Pulses 10 pl/pulse

50 Pulses 35 pl per pulse

PIEZOELECTRIC CHARGED DROPLET SOURCE

CROSS-REFERENCE TO RELATED APPLICATIONS

This application claims priority under 35 U.S.C. 119(e) to provisional patent application No. 60/280,632, filed Mar. 29, 2001, which is hereby incorporated by reference in its entirety to the extent not inconsistent with the disclosure herein.

STATEMENT REGARDING FEDERALLY SPONSORED RESEARCH OR DEVELOPMENT

This invention was made with U.S. Government support awarded by the following agency: NIH HG01808. The United States Government has certain rights in this invention.

FIELD OF INVENTION

This invention is in the field of mass spectrometry and instrumentation for the generation of charged droplets, particularly in applications to ion sources for mass spectrometry and related analytical instruments.

BACKGROUND OF INVENTION

Over the last several decades, mass spectrometry has emerged as one of the most broadly applicable analytical tools for detection and characterization of a wide variety of molecules and ions. This is largely due to the extremely sensitive, fast and selective detection provided by mass spectrometric methods. While mass spectrometry provides a highly effective means of identifying a wide class of molecules, its use for analyzing high molecular weight compounds is hindered by problems related to generating, transmitting and detecting gas phase analyte ions of these species.

First, analysis of important biological compounds, such as oligonucleotides and oligopetides, by mass spectrometric methods is severely limited by practical difficulties related to low sample volatility and undesirable fragmentation during vaporization and ionization processes. Importantly, such fragmentation prevents identification of labile, non-covalently bound aggregates of biomolecules, such as protein—protein complexes and protein—DNA complexes, that play an important role in many biological systems including signal transduction pathways, gene regulation and transcriptional control. Second, many important biological applications require ultra-high detection sensitivity and resolution that is currently unattainable using conventional mass spectrometric techniques. As a result of these fundamental limitations, the potential for quantitative analysis of samples containing biopolymers remains largely unrealized.

For example, the analysis of complex mixtures of oligonucleotides produced in enzymatic DNA sequencing reactions is currently dominated by time-consuming and labor-intensive electrophoresis techniques that may be complicated by secondary structure. The primary limitation hindering the application mass spectrometry to the field of DNA sequencing is the limited mass range accessible for the analysis of nucleic acids. This limited mass range may be characterized as a decrease in resolution and sensitivity with an increase in ion mass. Specifically, detection sensitivity on the order of $10^{-15}$ moles (or $6\times10^{8}$ molecules) is required in order for mass spectrometric analysis to be competitive with electrophoresis methods and detection sensitivity on the order of $10^{-18}$ moles (or $6\times10^{5}$ molecules) is preferable. Higher resolution is be needed to resolve and correctly identify the DNA fragments in pooled mixtures particularly those resulting from Sanger sequencing reactions.

In addition to DNA sequencing applications, current mass spectrometric techniques lack the ultra high sensitivity required for many other important biomedical applications. For example, the sensitivity needed for single cell analysis of protein expression and post-translational modification patterns via mass spectrometric analysis is simply not currently available. Further, such applications of mass spectrometric analysis necessarily require cumbersome and complex separation procedures prior to mass analysis.

The ability to selectively and sensitively detect components of complex mixtures of biological compounds via mass spectrometry would tremendously aid the advancement of several important fields of scientific research. First, advances in the characterization and detection of samples containing mixtures of oligonucleotides by mass spectrometry would improve the accuracy, speed and reproducibility of DNA sequencing methodologies. In addition, such advances would eliminate problematic interferences arising from secondary structure. Second, enhanced capability for the analysis of complex protein mixtures and multi-subunit protein complexes would revolutionize the use of mass spectrometry in proteomics. Important applications include: protein identification, relative quantification of protein expression levels, identification of protein post-translational modifications, and the analysis of labile protein complexes and aggregates. Finally, advances in mass spectrometric analysis of samples containing complex mixtures of biomolecules would also provide the simultaneous characterization of both high molecular weight and low molecular weight compounds. Detection and characterization of low molecular weight compounds, such as glucose, ATP, NADH, GHT, would aid considerably in elucidating the role of these molecules in regulating a myriad of important cellular processes.

Mass spectrometric analysis involves three fundamental processes: (1) desorption and ionization of a given analyte species to generate a gas phase ion, (2) transmission of the gas phase ion to an analysis region and (3) mass analysis and detection. Although these processes are conceptually distinct, in practice each step is highly interrelated and interdependent. For example, desorption and ionization methods employed to generate gas phase analyte ions significantly influence the transmission and detection efficiencies achievable in mass spectrometry. Accordingly, a great deal of research has been directed toward developing new desorption and ionization methods suitable for the sensitive analysis of high molecular weight compounds.

Conventional ion preparation methods for mass spectrometric analysis have proven unsuitable for high molecular compounds. Vaporization by sublimation or thermal desorption is unfeasible for many high molecular weight species, such as biopolymers, because these compounds tend to have negligibly low vapor pressures. Ionization methods based on the desorption process, however, have proven more effective in generating ions from thermally labile, nonvolatile compounds. Such methods primarily consist of processes that initiate the direct emission of analyte ions from solid or liquid surfaces. Although conventional ion desorption methods, such as plasma desorption, laser desorption, fast particle bombardment and thermospray ionization, are more applicable to nonvolatile compounds, these methods have substantial problems associated with ion fragmentation and low ionization efficiencies for compounds with molecular masses greater than about 2000 Daltons.

To enhance the applicability of mass spectrometry for the analysis of samples containing large molecular weight species, two new ion preparation methods recently emerged: (1) matrix assisted laser desorption and ionization (MALDI) and (2) electrospray ionization (ESI). These methods have profoundly expanded the role of mass spectrometry for the analysis of high molecular weight compounds, such as biomolecules, by providing high ionization efficiency (ionization efficiency=ions formed/molecules consumed in analysis) applicable to a wide range of compounds with molecular weights exceeding 100,000 Daltons. In addition, MALDI and ESI are characterized as "soft" desorption and ionization techniques because they are able to both desorb into the gas phase and ionize biomolecules with substantially less fragmentation than conventional ion desorption methods. *Karas* et. al, Anal. Chem., 60, 2299–2306 (1988) and *Karas et. al, Int. J. Mass Spectrom. Ion Proc.,* 78, 53–68 (1987) describe the application of MALDI as an ion source for mass spectrometry. Fenn, et. al, Science, 246, 64–71 (1989) describes the application of ESI as an ion source for mass spectrometry.

In MALDI mass spectrometry, the analyte of interest is co-crystallized with a small organic compound present in high molar excess relative to the analyte, called the matrix. The MALDI sample, containing analyte incorporated into the organic matrix, is irradiated by a short (~10 ns) pulse of UV laser radiation at a wavelength resonant with the absorption band of the matrix molecules. The rapid absorption of energy by the matrix causes it to desorb into the gas phase, carrying a portion of the analyte molecules with it. Gas phase proton transfer reactions ionize the analyte molecules within the resultant gas phase plume. Generally, these gas phase proton transfer reactions generate analyte ions in singly and/or doubly charged states. Upon formation, the ions in the source region are accelerated by a high potential electric field, which imparts equal kinetic energy to each ion. Eventually, the ions are conducted through an electric field-free flight tube where they are separated by mass according to their kinetic energies and are detected.

Although MALDI is able to generate gas phase analyte ions from very high molecular weight compounds (>2000 Daltons), certain aspects of this ion preparation method limit its utility in analyzing complex mixtures of biomolecules. First, fragmentation of analyte molecules during vaporization and ionization gives rise to very complex mass spectra of parent and fragment peaks that are difficult to assign to individual components of a complex mixture. Second, the sensitivity of the technique is dramatically affected by sample preparation methodology and the surface and bulk characteristics of the site irradiated by the laser. As a result, MALDI analysis yields little quantitative information pertaining to the concentrations of the materials analyzed. Finally, the ions generated by MALDI possess a very wide distribution of trajectories due to the laser desorption process, subsequent ion—ion charge repulsion in the plume and collisions with background matrix molecules. This spread in analyte ion trajectories substantially decreases ion transmission efficiencies achievable because only ions translating parallel to the centerline of the mass spectrometer are able to reach the mass analysis region and be detected.

In contrast to MALDI, ESI is a field desorption ionization method that provides a highly reproducible and continuous stream of analyte ions. It is currently believed that the field desorption occurs by a mechanism involving strong electric fields generated at the surface of a charged substrate which extract solute analyte ions from solution into the gas phase. Specifically, in ESI mass spectrometry a solution containing solvent and analyte is passed through a capillary orifice and directed at an opposing plate held near ground. The capillary is maintained at a substantial electric potential (approximately 4 kV) relative to the opposing plate, which serves as the counter electrode. This potential difference generates an intense electric field at the capillary tip, which draws some free ions in the exposed solution to the surface. The electrohydrodynamics of the charged liquid surface causes it to form a cone, referred to as a "Taylor cone." A thin filament of solution extends from this cone until it breaks up into droplets, which carry excess charge on their surface. The result is a stream of small, highly charged droplets that migrate toward the grounded plate. Facilitated by heat and/or the flow of dry bath gases, solvent from the droplets evaporates and the physical size of the droplets decreases to a point where the force due to repulsion of the like charges contained on the surface overcomes the surface tension causing the droplets to fission into "daughter droplets." This fissioning process may repeat several times depending on the initial size of the parent droplet. Eventually, daughter droplets are formed with a radius of curvature small enough that the electric field at their surface is large enough to desorb analyte species existing as ions in solution. Polar analyte species may also undergo desorption and ionization during electrospray by associating with cations and anions in the liquid sample.

Because ESI generates a highly reproducible stream of gas phase analyte ions directly from a solution containing analyte ions, without the need for complex, off-line sample preparation, it has considerable advantages over analogous MALDI techniques. Certain aspects of ESI, however, currently prevent this ion generating method from achieving its full potential in the analysis complex mixtures of biomolecules. First, as ionization proceeds via the formation of highly charged liquid droplets, ions generated in ESI invariably possess a wide distribution of multiply charged states for each analyte discharged. Accordingly, ESI-MS spectra of mixtures are typically a complex amalgamation of peaks attributable to a large number of populated charged states for every analyte present in the sample. These spectra often possess too many overlapping peaks to permit effective discrimination and identification of the various components of a complex mixture. In addition, highly charged gas phase ions are often unstable and fragment prior to detection, which further increases the complexity of ESI-MS spectra.

Second, a large percentage of ions formed by electrospray ionization are lost during transmission into and through the mass analyzer. Many of these losses can be attributed to divergence in the stream of ions generated. Mutual charge repulsion of ions is a major contributor to beam spreading. In this process, charged droplets and gas phase ions formed by ESI mutually repel each other during transmission from the source to an analysis and detection region. This mutual charge repulsion significantly widens the spatial distribution of the droplet and/or gas phase ion stream and causes significant deviation from the centerline of the mass spectrometer. As the sensitivity of the ESI-MS technique depends strongly on the efficiency with which analyte ions are transported into and through a mass analyzer, the spread in gas phase ion trajectories substantially decreases detection sensitivity attainable in ESI-MS. In addition, spread in ion position is also detrimental to the resolution of the mass determination. For example, in pulsed orthogonal time-of-flight detection, the spread in ion position prior to orthogonal extraction substantially influences the resolution attainable. Divergence of the gas phase ion stream is a major source of deviations in ion start position and, hence, degrades the resolution attainable in the time-of-flight analysis of ions generated by ESI. Typically, small entrances apertures for orthogonal extraction are employed to compensate for these deviations, which ultimately result in a substantial decrease in detection sensitivity.

Finally, ESI, as a continuous ionization source, is not directly compatible with time-of-flight mass analysis. Time-of-flight (TOF) detection is currently the most widely employed detection method for large biomolecules due to its ability to characterize the mass to charge ratio of very high molecular weight compounds. To obtain the benefits from both ESI ion generation and TOF mass analysis, techniques have been developed to segment the continuous ion stream generated in ESI into discrete packets. For example, in conventional TOF analysis electrospray-generated ions are periodically pulsed into an electric field-free-flight tube positioned orthogonal to the axis along which the ions are generated. In the flight tube, the analyte ions are separate by mass according to their kinetic energies and are detected at the end of the flight tube. In this configuration it is essential that the accelerated packets of ions are sufficiently temporally separated with adequate spacing to avoid overlap of consecutive mass spectra. Although ions are generated continuously in ESI-TOF, mass analysis by orthogonal extraction is limited by the duty cycle of the extraction pulse. Most ESI-TOF instruments have a duty cycle between 5% and 50%, depending on the m/z range of the ions being analyzed. Therefore, the majority of ions formed in ESI-TOF are never actually mass analyzed or detected because ion production is not synchronized with detection.

Recently, research efforts have been directed at developing new field desorption ion sources that provide more efficient transmission and detection of the ions generated. One method of improving the transmission and detection efficiencies of ions generated by field desorption involves employing pulsed charged droplet sources that are capable of generating a stream of discrete, single droplets or droplet packets with directed momentum. As the droplets generated by such a droplet source are temporally and spatially separated, mutual charge repulsion between droplets is minimized. Further, ion formation and detection processes may be synchronized by employing a pulsed source, which eliminates the dependence of detection efficiency on the duty cycle of orthogonal extraction in time-of-flight detection.

Although there are a variety of ways that liquid droplets may be generated (e.g. electrical, pneumatic, acoustical or mechanical), a mechanical means of droplet production, piezoelectric droplet generation, has the unique advantage of being able to produce a single droplet event. Piezoelectric droplet generators have been used in many applications including but not limited to ink-jet printing, studies of droplet evaporation and combustion, droplet collision and coalescence, automatic titration, and automated reagent dispensing for molecular biological protocols. Various configurations of piezoelectric droplet sources are described by Zoltan in U.S. Pat. Nos. 3,683,212, 3857,049 and 4,641,155.

There are two piezoeletric methods which produce monodisperse droplets with directed momentum: (1) continuous production by Rayleigh breakup of a liquid jet and (2) droplet-on-demand production by rapid pressure pulsation. In the latter method, a single droplet is released from the end of a capillary as the result of a rapid pressure pulsation generated by a radially contracting piezoelectric element. The size of the droplet produced depends on the solution conditions, orifice diameter, and amplitude and duration of the pressure wave applied. The characteristics of the pressure wave are in turn controlled by the amplitude and duration of the electronic pulse applied to the piezoelectric element.

Hager et al. obtained a mass spectrum of dodecyldiamine (Molecular Mass=201 amu) by incorporating a continuous droplet source with a Sciex TAGA 6000E mass spectrometer (Hager, D.B. et al., Appl. Spectrosc., 46, 1460–1463 (1992)). Using a piezoelectric source, they generated a continuous stream of neutral droplets. After formation, the droplets were charged using an external charging element comprising a corona discharge positioned near the droplet stream. While Hager et al. report successful ion generation via field desorption of droplets generated by a piezoelectric source, electric fields generated by the external corona discharge were observed to significantly perturbed the trajectories of the charged droplets generated. Specifically, FIG. 3 of this reference indicates that the corona discharged caused defection of droplet trajectories up to approximately 450 from the droplets original trajectory. Accordingly, Hager et al. report decreases in ion intensities by a factor of 2–3 relative to conventional electrospray ionization. Further, Hager et al. report no results with higher molecular weight species. Finally, the apparatus described by Hager et al. is not amenable to single droplet production or discretely controlled droplet formation because it employs a continuous droplet source which utilizes Rayleigh breakup of a liquid jet that is not capable of discrete pulsed droplet generation.

Murray and He demonstrated the feasibility of performing mass spectrometry on discretely produced droplets using a MALDI process for generating ions [He, L. And Murray, K., J Mass Spectrom., 34, 909–914 (1999)]. The authors report the use of a piezoelectric droplet source to prepare a sample for MALDI analysis. Specifically, a droplet-on-demand droplet dispenser was used to create dried aerosol particles consisting of matrix and sample. The aerosol particles were ionized by laser irradiation in a MALDI instrument equipped for atmospheric sampling. Murray and He report that 4500 droplets were needed (approximately 50 picomoles of analyte) to obtain a mass spectrum. The authors speculate that the low sensitivity observed was due to poor particle transmission efficiency.

Miliotis et al. report the use of a piezoelectric droplet generator to prepare samples containing an analyte of interest and an organic matrix for MALDI analysis [Miliotis et al., J. Mass Spectrometry, 35, 369–377 (2000)]. Use of the piezoelectric droplet generator in this reference is limited to sample preparation. Miliotis et al. do not report use of a piezoelectric droplet generator as an ion source.

It will be appreciated from the foregoing that a need exists for pulsed field desorption ion sources that are capable of generating a stream of single droplets or discrete, packets of droplets having an electrical charge. The present invention provides a charged droplet source able to provide pulsed production of electrically charged single droplets or discrete packets of electrically charged droplets with directed momentum. Further, this invention describes methods of using this charged droplet source to generate gas phase analyte ions from chemical species, including high molecular weight biopolymers, for detection via conventional mass analysis.

SUMMARY OF THE INVENTION

The present invention provides methods and devices for generating charged droplets and/or gas phase ions from liquid samples containing chemical species, including but not limited to chemical species with high molecular mass.

The methods and devices of the present invention provide a pulsed stream of electrically charged single droplets or packets of electrically charged droplets of either positive or negative polarity. Further, the methods of the present invention also provide a pulsed stream of single gas phase ions or packets of gas phase analyte ions of either positive or negative polarity. More specifically, the present invention provides charged droplet and/or ion sources with adjustable control of droplet exit time, ion formation time, repetition rate and charge state of the droplets and/or ions formed for use in mass analysis, and particularly in mass spectrometry.

In one embodiment, a charged droplet source of the present invention comprises a piezoelectric droplet generator, which generates discrete and controllable numbers of electrically charged droplets. The droplet source of this embodiment is capable of generating a stream comprising single droplets with momentum substantially directed along a droplet production axis. Alternatively, the droplet source is capable of generating a stream comprising discrete, packets of droplets with momentum substantially directed along a droplet production axis. The droplet generator is capable of providing electrically charged droplets directly and does not require an external charging means. In a preferred embodiment, the charged droplets have a well-characterized spatial distribution along the droplet production axis. The charged droplet source of the present invention is capable of providing a stream of individual droplets and/or packets of droplets that have a substantially uniform and selected spacing along the droplet production axis. Alternatively, the charged droplet source of the present invention is capable of providing a stream of individual droplets and/or packets of droplets in which the spacing between droplets is individually selected and not uniform.

In a specific embodiment, the droplet generator comprises a piezoelectric element with an axial bore having an internal end and an external end. In a preferred embodiment, the piezoelectric element is cylindrical. Within the axial bore is a dispenser element for introducing a liquid sample held at a selected electric potential. The dispenser element has an inlet end that extends a selected distance past the internal end of the axial bore and a dispensing end that extends a select distance past the external end of the axial bore. The external end of the dispensing tube terminates at a small aperture opening, which is positioned directly opposite a grounded element. In a preferred embodiment, the grounded element is metal plate held at a selected electric potential substantially close to ground The electric potential of the liquid sample is maintained at a selected electric potential by placing the liquid sample in contact with an electrode. The electrode is substantially surrounded by a shield element that substantially prevents the electric field, electromagnetic field or both generated from the electrode from interacting with the piezoelectric element. In a more preferred embodiment, the shield element is the dispenser element itself.

Charged droplets are generated from the liquid sample upon the application of a selected pulsed electric potential to the piezoelectric element, which generates a pulsed pressure wave within the axial bore. In a preferred embodiment, the pulsed pressure wave is a pulsed radially contracting pressure wave. The amplitude and temporal characteristics, including the onset time, frequency, amplitude, rise time and fall time, of the pulsed electric potential is selectively adjustable by a piezoelectric controller operationally connected to the piezoelectric element. In turn, the temporal characteristics and amplitude of the pulsed electric potential control the onset time, frequency, amplitude, rise time fall time and duration of the pressure wave created within the axial bore. The pulsed pressure wave is conveyed through the dispenser element and creates a shock wave in a liquid sample in the dispenser element. This shock wave results in a pressure fluctuation in the liquid sample that generates charged droplets.

The droplet source of the present invention may be operated in two modes with different output: (1) a discrete droplet mode or (2) a pulsed-stream mode. In the discrete droplet mode, each pressure wave results in the formation of an electrically charged single droplet, which exits the dispenser end of the dispenser element. In the pulsed-stream mode, a discrete, elongated stream of electrically charged droplets exits the dispenser end upon application of each pressure wave. In both discrete droplet mode and pulsed-stream mode, the droplet exit time is selectably adjustable by controlling the amplitude and temporal characteristics of the pulsed electric potential applied to the piezoelectric element. Operation of the droplet source of the present invention in the pulsed-stream mode tends to generate smaller charged droplets with a greater ratio of surface area to volume. Droplets with a smaller surface area to volume ratio are especially beneficial when using the charged droplet source of the present invention to generate gas phase ions because these droplets exhibit greater ionization efficiency.

The charged droplet or pulsed stream of droplets exits the dispenser end of the dispenser element at a selected exit time and has a momentum substantially directed along the droplet production axis. Size of the droplets produced from the charged droplet source of the present invention depend on a number of variables including (1) the composition of the liquid sample, (2) the diameter of the small aperture opening, and (3) the amplitude and temporal characteristics of the pulsed electric potential. In another preferred embodiment, the droplet exits the dispensing end into a flow of bath gas that is directed along the droplet production axis. The charged droplets formed may have either positive or negative polarity. Applying a negative electric potential to the electrode in contact with the liquid sample generates negatively charged droplets and applying a positive electric potential to the electrode in contact with the liquid sample generates positively charged droplets.

The piezoelectric element in the present invention may be composed of any material that exhibits piezoelectricity. In an exemplary embodiment, the piezoelectric element is composed of PZT-5A, which is a lead zirconate titanate crystal. In an exemplary embodiment, the piezoelectric element is cylindrical and has a cylindrical axial bore that is oriented along the central axis of the piezoelectric element. Preferably, the piezoelectric cylinder has an outer diameter of about 2.9 millimeters and a length of about 12.7 millimeters. In this preferred embodiment, the cylindrical axial bore has an inner diameter of about 1.7 millimeters. It should be recognized by those skilled in the art, that the piezoelectric element of this invention may have any shape that includes an axial bore and may take on other dimensions than those recited here. Choice of the physical dimensions of the piezoelectric element is important in achieving a pressure wave within the axial bore with the appropriate physical and temporal characteristics.

The dispenser element of the present invention can be made of any material that is capable of transmitting the pressure wave generated by the pulsed pressure wave within the axial bore to the liquid sample. Preferably, the dispensing tube is composed of a chemically inert material that does not substantially conduct electric charge. If an electrically conducting material is chosen, such a stainless steel, an insulator capable of transmitting the pressure wave generated by the pulsed pressure wave is preferably positioned between the dispenser element and the piezoelectric element to substantially prevent electrical conduction from the liquid sample and the piezoelectric element. In preferred embodiments, the dispenser element comprises a glass capillary. In a more preferred embodiment, the dispenser element is a glass capillary with an inner diameter of about 0.8 millimeters and an outer diameter of about 1.5 millimeters. In an exemplary embodiment, the distance the dispensing end of the dispenser element extends from the external end of the axial bore ranges from about 2 millimeters to about 9 millimeters.

It should be understood by persons of ordinary skill in the art that the dispenser element of the present invention may have any shape capable of fitting within the axial bore of the piezoelectric element. In a preferred embodiment, the dispenser element is cylindrical. The dispenser element may also have any volume. A small dispenser element volume may be preferable when analyzing small quantities of liquid sample or low levels of analyte. Alternatively, a large dispenser element volume may be preferable when repeated sampling of a liquid sample in abundance is required.

The dispenser element of the present invention may be bonded into the axial bore of the piezoelectric element or, alternatively, it may be readily removable. If bonded in the axial bore, the adhesive or other bonding material must be capable of transmitting the pulsed pressure wave generated in the axial bore. In a preferred embodiment, the adhesive or other bonding material does not substantially conduct electric charge. In a preferred embodiment, the dispenser element is bonded in the axial bore with epoxy. In another embodiment, the dispenser element is removable to allow external sampling prior to analysis. In this embodiment, the dispenser element may be taken to a sampling site, loaded with sample and returned to the axial bore for droplet formation. In this embodiment, the dispenser element must fit sufficiently tightly within the axial bore to be able to effectively transmit the pressure wave originating from the piezoelectric element.

The small aperture opening of the dispensing end may have any diameter capable of producing charged droplets from the liquid sample upon application of the pulsed electric potential. In a preferred embodiment the small aperture opening has a diameter of about 20 microns or more. A small aperture opening of 20 microns or more is beneficial because it reduces considerably the incidence of tip clogging which is often observed using a small aperture opening below 10 microns in diameter. Further, a 20 micron or greater small aperture opening is desirable because it (1) is easy to clean, (2) is easy to reuse, (3) facilitates sample loading and (4) assists in the initiation of electrospray.

It should be apparent to anyone of skill in the art that any kind of electrode capable of holding the liquid sample at a substantially constant electric potential is useable in the present invention. In preferred embodiments, the electric potential of the liquid sample can be selectively changed. In a preferred embodiment, the electrode is a platinum electrode and the liquid sample is held at a potential ranging from −5,000 to 5,000 volts relative to ground and more preferably from −3,000 to 3,000 volts relative to ground. Maintaining this lower electric potential generates charged droplets with a lower charge state distribution. A lower charge state distribution may be desirable if the charged droplets are used to generate gas phase ions with minimized fragmentation.

In the charged droplet source of the present invention, the electrode is substantially surrounded by a shield element. The shield element defines a region wherein electric and/or electromagnetic fields generated by the electrode are minimized. In a preferred embodiment the piezoelectric element and/or the piezoelectric controller are within the shielded region. Minimizing the extent of electric fields, electromagnetic fields or both generated from the electrode that interact with the piezoelectric element and/or piezoelectric controller is desirable to allow precise control of the amplitude and temporal characteristics of the pulsed electric potential, the pressure wave and the size and production rate of charged droplets. Accordingly, minimizing the extent electric fields, electromagnetic fields or both generated from the electrode that interact with the piezoelectric element and/or piezoelectric controller is desirable to ensure proper control over the droplet exit time, repetition rate, size and charge state of the droplets. In a preferred embodiment, the dispenser element, itself, is the shield element. In a most preferred embodiment, the dispenser element is a glass capillary that does not substantially conduct electric charge that is cemented into the axial bore using a non-conducting epoxy.

In a preferred embodiment, a plurality of electrically charged droplets is generated sequentially in a flow of bath gas. Each droplet is formed via a separate pressure wave and, therefore, has a unique droplet exit time. The output of this embodiment consists of a stream of individual electrically charged droplets each having a momentum substantially directed along the droplet production axis. This embodiment provides a charged droplet source with controlled timing and spatial location of the droplets along the droplet production axis. In this embodiment, the repetition rate is selectively adjustable. In a more preferred embodiment, a repetition rate is selected that provides a stream of individual drops that are spatially separated such that the individual droplets do not substantially exert forces on each other due to mutual charge repulsion. Minimizing mutual charge repulsion between droplets is desirable because it prevents electrostatic and/or electrodynamic deflection of the droplets from disrupting the well defined droplet trajectories characterized by a momentum substantially directed along the droplet production axis. In another preferred embodiment, the charged droplets have a substantially uniform velocity.

In another embodiment, the electrically charged droplets generated have a substantially uniform diameter. In a preferred embodiment, the electrically charged droplets have a diameter ranging from about 1 micron to about 100 microns. In a more preferred embodiment, the electrically charged droplets have a diameter of about 20 microns. In another embodiment, the composition of the liquid sample, the frequency, amplitude, rise time and fall time of the pressure wave or any combinations thereof are adjusted to select the diameter of the electrically charged droplets formed. In a preferred embodiment, composition of the liquid sample, the frequency, amplitude, rise time and fall time of the pressure wave or any combinations thereof are adjusted to yield droplets having a volume ranging from approximately 1 to about 50 picoliters.

In another embodiment, the charge state of the electrically charged droplets is substantially uniform. In a preferred embodiment, the droplet source of the present invention comprises a source of charged droplets whereby the droplet charging process and the droplet formation process are independently adjustable. This configuration provides independent control of the droplet charge state distribution without substantially influencing the repetition rate, exit time and size of the charged droplets formed. Accordingly, it is possible to limit the degree of droplet charging, independent of droplet size and formation time, as desired by selecting the electric potential applied to the liquid sample. Therefore, the present invention provides a means of producing droplets from liquid samples in which the charge state of individual droplets may be selectively controlled. The ability to select droplet charge state is especially desirable when the droplets generated are used to produce gas phase analyte ions with minimized fragmentation. For this application of the present invention, applying lower electrostatic potentials to the liquid sample is preferred.

In a preferred embodiment, the liquid sample contains chemical species in a solvent, carrier liquid or both. Accordingly, the charged droplets generated also contain chemical species in a solvent, carrier liquid or both. In a preferred embodiment, the chemical species are selected from the group comprising: one or more oligopeptides, one or more oligonucleotides, one or more carbohydrate. In another preferred embodiment, the concentration of the liquid sample is such that each droplet contains a single chemical species in a solvent, carrier liquid or both. In a more preferred embodiment, the concentration of chemical species in the liquid sample ranges from about 1 to 50 picomoles per liter.

Sampling in the present invention may be from a static liquid sample of fixed volume or from a flowing liquid sample. Liquid may be introduced to the dispenser in any manner, including but not limited to (1) filling from the inlet end via application of a positive pressure and (2) aspiration from the dispensing end. In a preferred embodiment, microfluidic sampling methods may be employed by coupling the dispenser element to a microfluidic sampling device. In a preferred embodiment, the dispenser element is operationally coupled to an online purification system to achieve solution phase separation of solutes in a sample containing analytes prior to charged droplet formation. The online purification system may be any instrument or combination of instruments capable of online liquid phase separation. Prior to droplet formation, liquid sample containing solute is separated into fractions, which contain a subset of species (including analytes) of the original solution. For example, separation may be performed so that each analyte is contained in a separate fraction. On line purification methods useful in the present invention include but are not limited to high performance liquid chromatography, capillary electrophoresis, liquid phase chromatography, super critical fluid chromatography, microfiltration methods and flow sorting techniques.

The present invention also comprises an ion source, which generates discrete and controllable numbers of gas phase ions. In a preferred embodiment, the gas phase analyte ions have a momentum substantially directed along a droplet production axis and are spatially distributed along the droplet production axis. In a more preferred embodiment, the gas phase analyte ions generated travel substantially the same well-defined trajectory. An ion source providing gas phase analyte ions that traverse substantially the same trajectory is especially beneficial because it significantly increases the ion collection efficiency attainable.

In this embodiment, the charge droplet source described above is operationally coupled to a field desorption region and the liquid sample contains chemical species in a solvent, carrier liquid or both. In a preferred embodiment, the chemical species are selected from the group comprising: one or more oligopetides, one or more oligonucleotides, one or more and/or one or more carbohydrate. Positively charged droplets or negatively charged droplets of the liquid sample exit the dispenser end of the dispenser element and are conducted by a flow of bath gas through a field desorption region positioned along the droplet production axis. The flow of bath gas can be accomplished by any means capable of providing a flow along the droplet production axis. In the field desorption region, solvent, carrier liquid or both are removed from the droplets by at least partial evaporation or desolvation to produce a flowing stream of smaller charged droplets, gas phase analyte ions or both. In a preferred embodiment, the gas phase analyte ions have a momentum substantially directed along the droplet production axis. Evaporation of positively charged droplets results in formation of gas phase analyte ions that are positively charged and evaporation of negatively charged droplets results in formation of gas phase analyte ions that are negatively charged. The charged droplets, gas phase analyte ions or both remain in the field desorption region for a selected residence time controlled by selectively adjusting the linear flow rate of bath gas and/or the length of the field desorption region. In a preferred embodiment, the charged droplets remain in the field desorption region for a selected residence time sufficient to cause substantially all the chemical species to become gas phase analyte ions. In another preferred embodiment, the gas phase analyte ions have a substantially uniform velocity.

In another embodiment, the rate of evaporation or desolvation in the field desorption region is selectably adjusted. This may be accomplished by methods well known in the art including but not limited to: (1) heating the field desorption region, (2) introducing a flow of dry bath gas to the field desorption region or (3) combinations of these methods with other methods known in the art. Control of the rate of evaporation is beneficial because sufficient evaporation is essential to obtain a high efficiency of ion formation.

In a preferred embodiment of the ion source of the present invention, the field desorption region is substantially free of electric fields generated by sources other than the charged droplets and gas phase analyte ions themselves. In a particular embodiment of the present invention, the electric fields, electromagnetic fields or both generated by the droplet source are substantially minimized in the field desorption region. Maintaining the field desorption region substantially free of electric fields is desirable to prevent disruption of the well-defined trajectories of the gas phase analyte ions generated. In addition minimizing the extent of electric fields, electromagnetic fields or both is beneficial because it prevents unwanted loss of charged droplets and/or ions on the walls of the apparatus and allows for efficient collection of gas phase analyte ions generated by the ion source of the present invention.

Gas phase ions may be prepared from charged droplets generated in either single-droplet or a pulsed-stream mode. Generating gas phase ions from charged droplets generated in the pulsed-stream mode has the advantage that the droplets generated tend to be smaller in diameter and, thus, have large surface area to volume ratios. Higher surface area to volume ratio results in a larger proportion of analyte molecules available for desorption and provides a higher ion production efficiency. Alternatively, generating ions from charged droplets generated in the single-droplet mode has the advantage that mutual charge repulsion of charged droplets is substantially lessened in this mode. Thus, the gas phase ions generated will have a more uniform trajectory.

In a preferred embodiment, individual gas phase analyte ions are generated separately and sequentially in a flow of bath gas. In this embodiment, solution composition is chosen such that each droplet contains only one analyte molecule in a solvent, carrier liquid or both. As each charged droplet is formed via a separate pressure wave, each droplet has a corresponding unique droplet exit time. Upon droplet evaporation in the field desorption region, a single gas phase analyte ion is produced from each charged droplet. In a more preferred embodiment, the repetition rate of the charge droplet source is selected such that it provides a stream of individual gas phase analyte ions that are spatially separated such that the individual analyte ions do not substantially exert forces on each other due to mutual charge repulsion. Minimizing mutual charge repulsion between gas phase analyte ions is beneficial because is preserves the well-defined trajectory of each analyte ion along the droplet production axis.

The present invention also comprises methods of reducing fragmentation of ions generated by field desorption methods. In a preferred embodiment, the ion source of the present invention comprises a source of charged droplets whereby the charging process and the droplet formation process are independently adjustable. This arrangement provides independent control of the droplet charge state attainable without substantially influencing the repetition rate, exit time and size of the charged droplets formed. Selection of the droplet charge state ultimately selects the charge state distribution of gas phase analyte ions formed in the field desorption region. In the present invention it is possible to limit the degree of droplet charging as desired to select a gas phase analyte ion charge state distribution centered around a charge state wherein the gas phase ion is substantially stable and not subject to fragmentation. By employing single droplets produced by a process whereby charging is independent of droplet generation it is possible to limit the degree of droplet charging as desired. Accordingly, the charge state of the droplets generated can be adjusted by selecting the electric potential applied to the liquid sample. This allows for control of the amount of charge on the droplet surface and, hence, the charge state distribution of the gas phase analyte ions generated. Employing lower electric potentials is beneficial because it allows for direct production of gas phase analyte ions in lower charge states, which are less susceptible to fragmentation. Accordingly, the ion source of the present invention is capable of generating gas phase analyte ions with minimized fragmentation. This application of the present invention is especially beneficially for the analysis of labile aggregates and complexes, such as protein—protein aggregates and protein-DNA aggregates, which fragment easily under high charge state conditions.

Although the ion source of the present invention may be used to generate ions from any chemical species, it is particularly useful for generating ions from high molecular weight compounds, such as peptides, oligonucleotides, carbohydrates, polysaccharides, glycoproteins, lipids and other biopolymers. The methods are generally useful for generating ions from organic polymers. In addition, the ion source of the present invention may be utilized to generate gas phase analyte ions, which possess molecular masses substantially similar to the molecular masses of the parent chemical species from which they are derived while present in the liquid phase. Accordingly, the present invention provides an ion source causing minimal fragmentation to occur during the ionization process. Most preferably for certain applications, the present invention may be utilized to generate gas phase analyte ions with a selectably adjustable charge state distribution.

Alternatively, the ion source of the present invention may be used to induce and control analyte ion fragmentation by selectively varying the extent of multiple charging of the gas phase analyte ions generated. Gas phase ion fragmentation is typically a consequence of the substantially large electric fields generated upon formation of highly multiply charged gas phase analyte ions. The occurrence of controllable fragmentation is useful in determining the identity and structure of chemical species present in liquid samples, the condensed phase and/or the gas phase. The ion source of the present invention may be used to induce fragmentation of gas phase analyte ions by placing the liquid sample in contact with a high electric potential (>5 kV).

In another embodiment, the ion source of the present invention comprises an ion source without the need for online separation and/or purification of the chemical species prior to gas phase ion formation. In this embodiment, solution conditions are selected such that each charged droplet contains only one chemical species in a solvent, carrier liquid or both. For example, a single analyte ion per charged droplet may be achieved by employing a concentration of less than or equal to about 20 picomoles per liter with a droplet volume of about 10 picoliters. In this embodiment, only one gas phase analyte is released to the gas phase and ionized per charged droplet. As only one ion is formed per droplet, the chemical species in the liquid sample are spatially separated and purified upon ion formation. In another embodiment, a plurality of gas phase analyte ions are generated from each charged droplet. In a preferred embodiment, the output of this embodiment comprises a stream of discrete packets of ions with a momentum substantially directed along the droplet production axis. In this embodiment, solution conditions are selected such that each charged droplet contains a plurality analyte species. Upon at least partial droplet evaporation, a plurality of gas phase analytes is released to the gas phase and ionized.

In a preferred embodiment, the charged droplet source of the present invention is operationally connected to a field desorption—charge reduction region to provide an ion source with selective control over the charge state distribution of the gas phase ions generated. In this embodiment, the charged droplet source generates a pulsed stream of electrically charged droplets in a flow of bath gas. The stream of charged droplets is conducted through a field desorption charge reduction region where solvent and/or carrier liquid is removed from the droplets by at least partial evaporation to produce a flowing stream of smaller charged droplets and multiply charged gas phase analyte ions. The charged droplets, analyte ions or both remain in the field desorption-charge reduction region for a selected residence time controllable by selectively adjusting the flow rate of bath gas and/or the length of the field desorption region.

Within the field desorption—charge reduction region, the stream of smaller charged droplets and/or gas phase analyte ions is exposed to electrons and/or gas phase reagent ions of opposite polarity generated from bath gas molecules by a reagent ion source positioned at a selected distance downstream of the electrically charged droplet source. The reagent ion source is surrounded by a shield element for substantially confining the boundaries of electric fields and/or electromagnetic fields generated by the reagent ion source. Electrons, reagent ions or both, generated by the reagent ion source, react with charged droplets, analyte ions or both within at least a portion of the field desorption-charge reduction region and reduce the charge-state distribution of the analyte ions in the flow of bath gas. Accordingly, ion—ion, ion—droplet, electron—ion and/or electron—droplet reactions result in the formation of gas phase analyte ions having a selected charge-state distribution. In a preferred embodiment, the charge state distribution of gas phase analyte ions is selectively adjustable by varying the interaction time between gas phase analyte ions and/or charged droplets and the gas phase reagent ions and/or electrons. In addition, the charge-state of gas phase analyte ions may be controlled by adjusting the rate of production of electrons, reagent ions or both from the reagent ion source. In addition, an ion source of the present invention is capable of generating an output consisting of analyte ions with a charge-state distribution that may be selected or may be varied as a function of time.

In another embodiment, the ion source of the present invention is operationally coupled to a charged particle analyzer capable of identifying, classifying and detecting charged particles. This embodiment provides a method of determining the composition and identity of substances, which may be present in a mixture. In an exemplary embodiment, the ion source of the present invention is operationally coupled to a mass analyzer and provides a method of identifying the presence of and quantifying the abundance of analytes in liquid samples. In a preferred embodiment, the droplet production axis is coaxial with the centerline of the mass analyzer to provide optimal ion transmission efficiency. In this embodiment, the output of the ion source is drawn into a mass analyzer to determine the mass to charge ration (m/z) of the ions generated from charged droplets generated by the droplet source of the present invention.

In an exemplary embodiment, the ion source of the present invention is coupled to an orthogonal time of flight (TOF) mass spectrometer to provide accurate measurement of m/z for compounds with molecular masses ranging from about 1 amu to about 50,000 amu. In a more preferred embodiment, pulsed droplet formation is synchronized with the extraction pulse of the TOF mass spectrometer. Synchronization of droplet production events and ion detection via pulsed orthogonal extraction is beneficial because it provides a detection efficiency (detection efficiency=(ions detected)/(ion formed)) independent of the duty cycle of the TOF mass analyzer. Other exemplary embodiments include, but are not limited to, ion sources of this invention operationally coupled to quadrupole mass spectrometers, tandem mass spectrometers, ion traps or combinations of these mass analyzers.

In an exemplary embodiment, the ion source of the present invention is coupled with a mass spectrometer to provide a method of single droplet mass spectrometry. In this embodiment, a mass spectrum is obtained for each individual droplet formed by the piezoelectric element.

Alternatively, the ion source of the present invention may be operationally connected to a device capable of classifying and detecting gas phase analyte ions on the basis of electrophoretic mobility. In an exemplary embodiment, the ion source of the present invention is coupled to a differential mobility analyzer (DMA) to provide a determination of the electrophoretic mobility of ions generated from liquid samples. This embodiment is beneficial because it allows ions of the same mass to be distinguished on the basis of their electrophoretic mobility, which in turn depends on the molecular structure of the gas phase ions analyzed.

The present invention also comprises methods of increasing the transmission efficiency of gas phase analyte ions generated by field desorption methods to a mass analyzer region. The ion source of the present invention is capable of generating a stream of gas phase analyte ions with a selectively directed momentum along a droplet production axis and with a substantially uniform trajectory along the droplet production axis. Coaxial alignment of the droplet production axis along the centerline axis of a mass analyzer, such as a time-of-flight detector, provides significant improvement of ion transmission efficiency over conventional ion sources. Enhanced ion transmission efficiency is beneficial because it results in increased sensitivity in the subsequent mass analysis and detection of chemical species.

In a preferred embodiment, the present invention comprises a device to analyze the composition of individual cells. In this embodiment, the liquid sample is prepared by lysing the analyte cell and subsequently separating the biomolecules, such as proteins and DNA, into separate fractions via a suitable liquid phase purification method. Next, the liquid sample is introduced to the dispenser element where it is dispensed into a stream of individual charged droplets or packets of charged droplets. Subsequent field desorption generates a source gas phase analyte ions that is conducted to a charged particle analysis region. In a preferred embodiment, the orthogonal time-of-flight mass spectrometry is used to determine the identity and concentration of biomolecules in the liquid sample prepared from the single cell.

The invention further provides methods of generating charged droplets employing the device configurations described herein. Additionally, the invention provides methods for the analysis of liquid samples, particularly biological samples employing the device configurations described herein.

The invention is further illustrated, but not limited, by the following description, examples and drawings.

BRIEF DESCRIPTION OF THE DRAWINGS

FIG. 1A illustrates the charged droplet source and method of preparing charged droplets of the present invention. FIG. 1B illustrates the gas phase ion source and method of preparing gas phase ions of the present invention. FIG. 1C illustrates devices and methods for determining the identities and concentrations of chemical species in liquid solutions

FIG. 5A shows the single-droplet mode and FIG. 5B shows the pulse elongated stream mode.

FIG. 7 shows a positive ion spectrum observed upon analysis of a sample containing bovine ubiquitin (8564.8 amu) at a concentration of 1 $\mu$M in 1:1 $H_2O$:acetonitrile, 1% acetic acid.

FIG. 8 shows a positive ion spectrum observed upon analysis of a sample containing a synthetic 18 mer oligonucleotide (SEQ ID NO:1) (ACTGGCCGT-CGTTTTACA, 5464.6 amu) at a concentration of 5 μM in 1:1 $H_2O$:$CH_3OH$, 400 mM HFIP (maintained at a pH of 7).

FIG. 10A displays the mass spectral analysis of 100 droplets, FIG. 10B displays the mass spectral analysis of 10 droplets and FIG. 10C displays the mass spectral analysis of a single droplet.

DETAILED DESCRIPTION OF THE INVENTION

Definitions

Figure 1A:
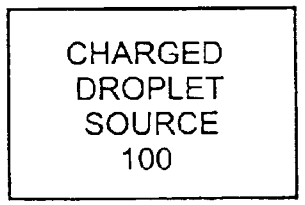
FIGS. 1A–C shows functional block diagrams of exemplary devices and methods of the present invention.

The following definitions are employed herein:

"Chemical species" refers generally and broadly to a collection of one or more atoms, molecules and/or macromolecules whether neutral or ionized. In particular, reference to chemical species in the present invention includes but is not limited to polymers. Chemical species in a liquid sample may be present in a variety of forms including acidic, basic, molecular, ionic, complexed and solvated forms. Chemical species also includes non-covalently bound aggregates of molecules. Chemical species includes biological molecules, i.e. molecules from biological sources, including biological polymers, any or all of which may be in the forms listed above or present as aggregates of two or more molecules.

"Polymer" takes its general meaning in the art and is intended to encompass chemical compounds made up of a number of simpler repeating units (i.e., monomers), which typically are chemically similar to each other, and may in some cases be identical, joined together in a regular way. Polymers include organic and inorganic polymers which may include co-polymers and block co-polymers. Reference to biological polymers in the present invention includes, but is not limited to, peptides, proteins, glycoproteins, oligonucleotides, DNA, RNA, polysaccharides, and lipids and aggregates thereof.

"Ion" refers generally to multiply or singly charged atoms, molecules, macromolecules, of either positive or negative polarity and may include charged aggregates of one or more molecules or macromolecules.

"Electrically charged droplet" refers to droplets of a liquid sample in the gas phase that have an associated electrical charge. Electrically charged droplets can have any size (e.g., diameter). Electrically charged droplets may be composed of any combinations of the following: solvent, carrier liquid and chemical species. Electrically charged droplets may be singly or multiply charged and may possess positive or negative polarity.

"Charged particles" refers to any material in the gas phase having an electric charge of either positive or negative polarity. For example, charged particles may refer to primary charged droplets, secondary charged droplets, partially evaporated or desolvated droplets, completely evaporated or desolvated droplets, ions, aggregates of ions, ion complexes and clusters.

"Aggregate(s)" of chemical species refer to two or more molecules or ions that are chemically or physical associated with each other in a liquid sample. Aggregates may be non-covalently bound complexes. Examples of aggregates include but are not limited to protein—protein complexes, lipid—peptide complexes, protein—DNA complexes "Piezoelectric element" refers to an element that is composed of a piezoelectric material that exhibits piezoelectricity. Piezoelectricity is a coupling between a material's mechanical and electrical behaviors. For example, when a piezoelectric material is subjected to a voltage drop it mechanically deforms. Many crystalline materials exhibit piezoelectric behavior including, but not limited to quartz, Rochelle salt, lead titanate zirconate ceramics (e.g. PZT-4, PZT-5A), barium titanate and polyvinylidene fluoride.

The phrase "momentum substantially directed along an axis" refers to motion of an ion, droplet or other charged particle that has a velocity vector that is substantially parallel to the defining axis. In preferred embodiments, the invention of the present application provides droplet sources and ion sources with output having a momentum substantially directed along the droplet production axis. In the present invention, the defining axis is selectably adjustable and may be a droplet production axis, an ion production axis or the centerline axis of a mass spectrometer. The term "momentum substantially directed" is intended to be interpreted consistent with the meaning of this term by persons of ordinary skill in the art. The term is intended to encompass some deviations from a trajectory absolutely parallel to the defining axis. These deviations comprise a cone of angles deviating from the defining axis. It is preferable for many applications that deviations from the defining axis are minimized. Deviations for charged particles generated by operation of the charged droplet and gas phase ion sources of the present invention in discrete droplet mode includes droplet and/or gas phase ion trajectories that deviate from the defining axis by 200 or less. It is preferred in some applications, such as the use of ion sources of the present invention to transmit ions to a mass analysis region, that the deviations of charged droplet and/or gas phase ion trajectories from parallel to the reference axis be 50 or less. It is more preferred in some applications, such as the use of ion sources of the present invention to generate a single ion and transmit the ion to a mass analysis region, that the deviations of charged droplet and/or gas phase ion trajectories from parallel to the reference axis be 1° or less.

"Gas phase analyte ion(s)" refer to multiply charged ions, singly charged ions or both generated from chemical species in liquid samples. Gas phase analyte ions of the present invention may be of positive polarity, negative polarity or both. Gas phase analyte ions may be formed directly upon at least partial evaporation of solvent and/or carrier liquid from charged droplets. Gas phase analyte ions are characterized in terms of their charge-state, which is selectively adjustable in the present invention.

A "pressure wave" refers to a pulsed force, applied over a given unit area. For example, in the present invention a radially contracting pulse pressure wave is created within an axial bore that comprises a force that emanates from the cylindrical walls of an axial bore and is direct toward the central axis of the cylinder. In the present invention, the pressure wave is conveyed through a dispenser element and creates a shock wave in the sample solution. This shock wave results in a pressure fluctuation in the liquid sample that generates a single charged droplet or a pulsed elongated stream of droplets out the dispensing end of a dispensing tube. Non-radial pressures waves are expressly included within the definition of pressure wave.

"Solvent and/or carrier liquid" refers to compounds or mixtures present in liquid samples that dissolve or partially dissolve chemical species and/or aid in the dispersion of chemical species into droplets. Typically, solvent and/or carrier liquid are present in liquid samples in greatest abundance than chemical species (e.g., the analytes) therein. Solvents and carrier liquids can be single components (e.g., water or methanol) or a mixture of components (e.g., an aqueous methanol solution, a mixture of hexanes) Solvents are materials that dissolve or at least partially dissolve chemical species present in a liquid sample. Carrier liquids do not dissolve chemical species in liquid solutions but still assist in the dispersion of chemical species into droplets. Some chemical species are partial dissolved in liquid solutions such that one material may be both a solvent and a carrier liquid.

"Field desorption region" refers to a region downstream of the electrically charged droplet source with respect to passage of charged droplets emanating from the droplet source, e.g., the direction of the flow of bath gas carrying the droplets. Within the field desorption region, charged droplets are at least partially evaporated or desolvated resulting in the formation of smaller charged droplets and gas phase analyte ions.

"Liquid sample" refers to a homogeneous mixture or heterogeneous mixture of at least one chemical species and at least one solvent and/or carrier liquid. Commonly, liquid samples comprise liquid solutions in which chemical species are dissolved in at least one solvent. An example of a liquid sample useable in the present invention is a 1:1 MeOH/$H_2O$ solution containing one or more oligonucleotide or oligopeptide compound. Liquid samples may be obtained from a variety of natural or artificial sources and may contain biological species generated in nature or synthesized chemical species. Liquid samples may be biological samples including tissue or cell lysates or homogenates, serum, other biological fluids, cell growth media, tissue extracts, or soil extracts. A liquid sample may be derived from a discrete source such as a single cell or from a heterogeneous sample, such as a mixture of biological species. Liquid samples may also include samples of organic polymers, including biological polymers, including copolymers and block copolymers. Liquid samples may be directly introduced into the charged droplet source of this invention or pretreated to extract, separated, modify or purify the sample.

"Substantially uniform" in reference to the volume of charged droplets generated in discrete droplet mode refer to droplets that are in about 1% of a selected droplet volume.

"Bath gas" refers to a collection of gas molecules that transport charged droplets and/or gas phase analyte ions through a field desorption region. Preferably, bath gas molecules do not chemically interact with the droplets and/or gas phase ions generated by the present invention. Common bath gases include, but are not limited to, nitrogen, oxygen, argon, air, helium, water, sulfur hexafluoride, nitrogen trifluoride and carbon dioxide.

"Downstream" and "upstream" refers to the direction of flow of a stream of ions, molecules or droplets. Downstream and upstream is an attribute of spatial position determined relative to the direction of a flow of bath gas, gas phase analyte ions and/or droplets.

"Linear flow rate" refers to the rate by which a flow of materials pass through a given path length. Linear flow rate is measure in units of length per unit time (typically cm/s).

"Charged particle analyzer" refers generally to any device or technique for determining the identity, physical properties or abundance of charged particles. In addition, charge particle analyzers include devices that detect the presence of charged particles, that detect the m/z of an ion or that detect a property of an ion that is related to the mass, m/z, identity or chemical structure of an ion. Examples of charged particle analyzers include, but are not limited to, mass analyzers, mass spectrometers and devices capable of measuring electrophoretic mobility such as a differential mobility analyzer.

A "mass analyzer" is used to determine the mass to charge ratio of a gas phase ion. Mass analyzers are capable of classifying positive ions, negative ions or both. Examples include, but are not limited to, a time of fight mass spectrometer, a quadrupole mass spectrometer, residual gas analyzer, a tandem mass spectrometer, multi-stage mass spectrometers and an ion cyclotron resonance detector.

"Residence time" refers to the time a flowing material spends within a given volume. Specifically, residence time may be used to characterize the time gas phase analyte ions, charged droplets and/or bath gas takes to pass through a field desorption region. Residence time is related to linear flow rate and path length by the following expression: Residence time=(path length)/(linear flow rate).

"Droplet exit time" refers to the point in time in which a droplet exits the dispenser end of the dispenser element of the droplet source herein. In the present invention, droplet exit time is controllable by selectively adjusting the temporal characteristics, such as the initiation time, duration, rise time, fall time and frequency, and amplitude of the pulsed electric potential applied to the piezoelectric element.

"Shielded region" refers to a spatial region separated from a source that generates electric fields and/or electromagnetic fields by an electrically biased or grounded shield element. The extent of electric fields and/or electromagnetic fields generated by the electrode in the shielded region is minimized. The shielded region may include the piezoelectric element and piezoelectric controller.

"Ion charge-state distribution" refers to a two dimensional representation of the number of ions of a given elemental composition populating each ionic state present in a sample of ions. Accordingly, charge-state distribution is a function of two variables; number of ions and ionic state. Ion charge state distribution is a property of a selected elemental composition of an ion. Accordingly it reflects the ionic states populated for a specific elemental composition, but does not reflect the ionic states of all ions present in a sample regardless of elemental composition. "Droplet charge-state distribution" refers to a two dimensional representation of the number of charged droplets of a populating each charged state present in a sample of charged droplets. Accordingly, droplet charge-state distribution is a function of two variables; number of charged droplets and number of charged states associated with a given sample of charged droplets.

"Piezoelectric controller refers" generally to any device capable of generating a pulsed electric potential applied to the piezoelectric element. Various piezoelectric controllers are known in the art. The piezoelectric controller is operationally connected to the piezoelectric element and preferably provides independent control over any or all of the frequency, amplitude, rise time and/or fall time of a pulsed electric potential applied to the piezoelectric element. The temporal characteristics and amplitude of pulsed electric potential control the frequency, amplitude, rise time and fall time of the radially contracting pressure wave created in the axial bore.

"Selectively adjustable" refers to the ability to select the value of a parameter over a range of possible values. As applied to certain aspects of the present invention, the value of a given selectively adjustable parameter can take any one of a continuum of values over a range of possible settings.

Exemplary Device Configurations

This invention provides methods and devices for preparing charged droplets and/or gas phase analyte ions from liquid samples containing chemical species. In particular, the present invention provides a method of generating ions particularly suitable for high molecular weight compounds dissolved or carried in liquid samples.

Referring to the drawings, like numerals indicate like elements and the same number appearing in more than one drawing refers to the same element.

Figure 1B:
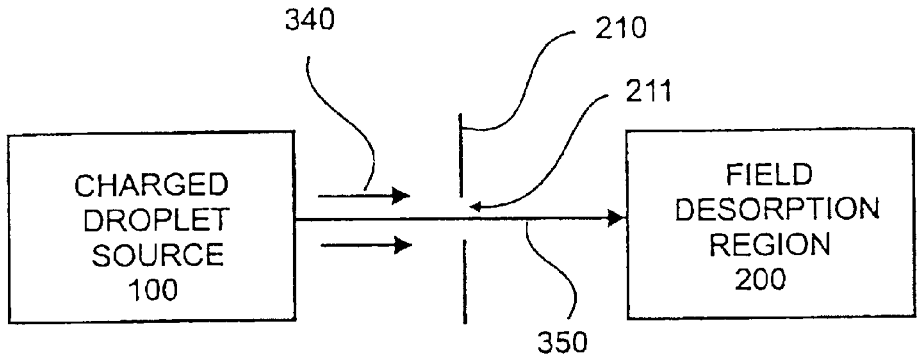
Figure 1C:
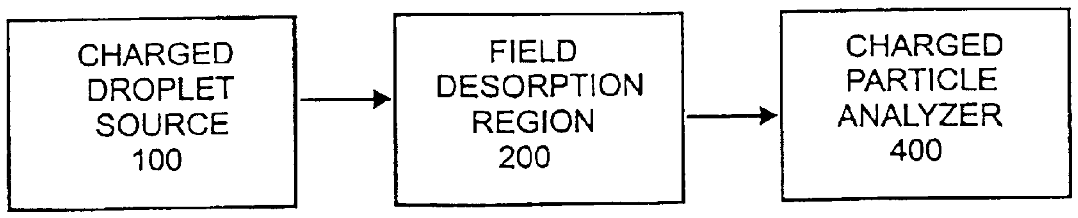

FIGS. 1A–C illustrate several exemplary embodiments of this invention related to charged droplet sources and their applications. It should be recognized that the depicted functions do not show details that should be familiar to those with ordinary skill in the art. FIG. 1A is a functional block diagram of a charged droplet source 100 for producing electrically charged droplets. FIG. 1B is a functional block diagram depicting a charged droplet source (100) operationally connected to a field desorption region (200) to at least partially desolvate or evaporate liquid from the droplets to generate smaller charged droplets or gas phase ions. FIG. 1C depicts an embodiment of the present invention in which a charged droplet source (100) and field desorption region (200) are operationally connected to a charge particle analyzer (400) to identify, detect and optionally quantify chemical species in droplets generated from a liquid sample.

Figure 2:
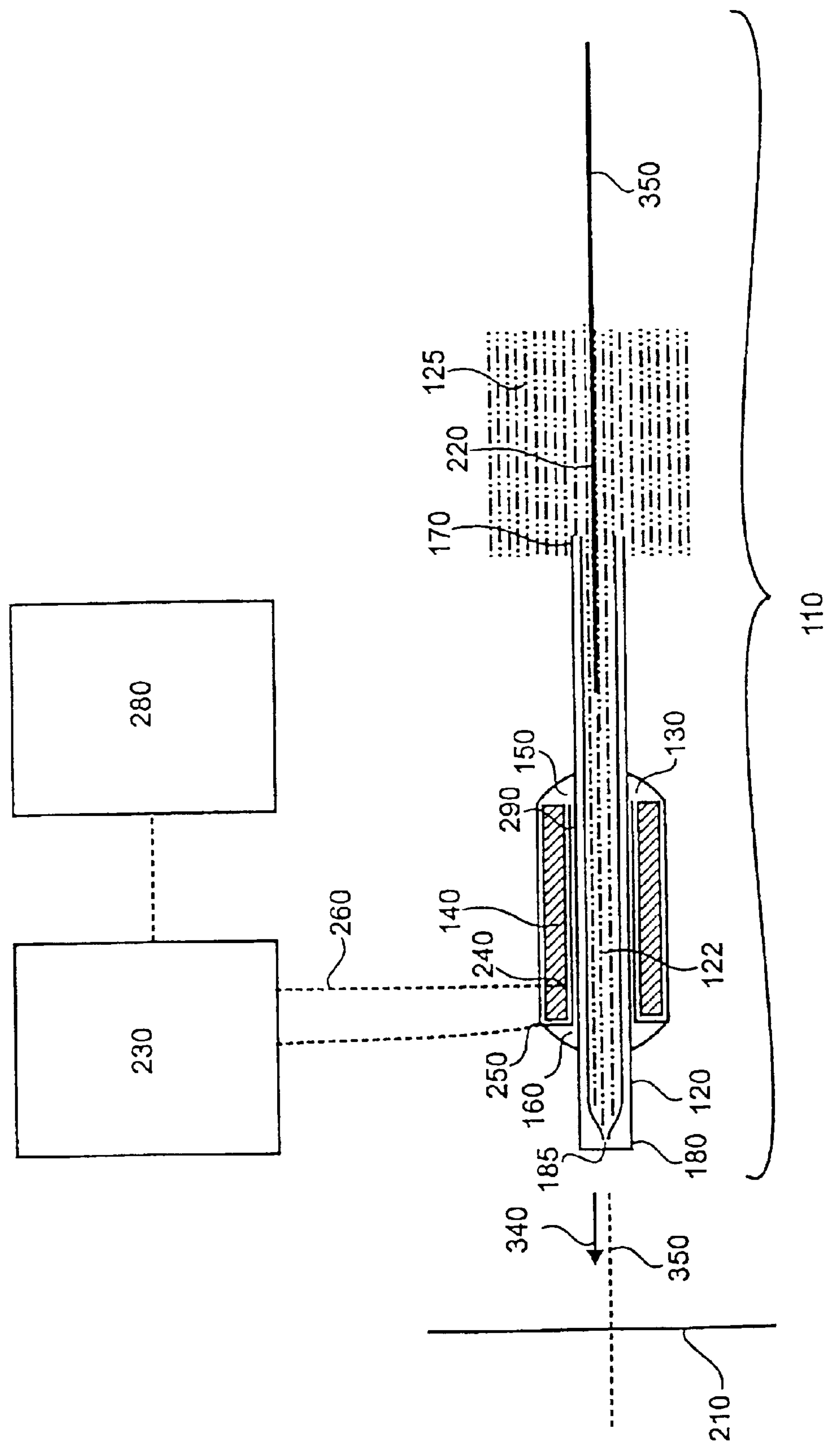
FIG. 2 shows a cross sectional longitudinal view of an exemplary charged droplet source.

FIG. 2 illustrates a charge droplet source of the present invention. The illustrated charged droplet source (110) consists of a dispenser element (120) that is attached within the axial bore (130) of a cylindrical piezoelectric element (140) by an adhesive epoxy layer (290). The bore of the piezoelectric element is sized and shaped for closely receiving the dispensing element. The dispensing element may be fixedly attached within the bore or may be removable from the bore. Piezoelectric element (140) has an internal end (150) and an external end (160). The piezoelectric element is operationally connected to piezoelectric controller (230) via electrical connections to nickel-plated electrodes on the inner (240) and outer surfaces (250) of the piezoelectric element, for example, via soldered 30 gauge wires (260).

The dispenser element extends past the internal end of the axial bore and terminates in an inlet end (170). The dispenser element extends past the external end and eventually tapers to a dispensing end (180). The dispenser element (120) has a cavity (122) for receiving a liquid sample (125). The dispensing end has a small aperture (185) and is positioned opposite ground plate (210) so that charged droplets are pass from the aperture to the group plate. The ground plate is either grounded or held at an electric potential substantially close to ground (approximately 100–200 volts of either positive or negative polarity). In a preferred embodiment, ground plate (210) provides for passage of charged droplets generated in the source and may, for example, be the entrance nozzle of a time-of-flight mass spectrometer. Platinum electrode (220) is inserted into the inlet end of the dispenser element and holds liquid sample (125) at a high electric potential (ranging from about +/−1000 volts to about +/−4000 volts) relative to the ground plate. Electrode (220) and liquid sample (125) are electrically insulated from piezoelectric element (140) by dispenser element (120) and epoxy layer (290). Further, dispenser element (120) and epoxy layer (290) act as a shield to minimize or prevent electric fields generated by the electrode from substantially interacting with the piezoelectric element (140) and the piezoelectric controller (230).

In an exemplary embodiment, piezoelectric element (140) is a cylinder 12.7 millimeters in length with a outer diameter of 2.95 millimeters and an axial bore with a diameter of 1.78 millimeters. Preferably, piezoelectric element (140) is composed of PZT-5A, which is a lead zirconate titanate crystal. The dispenser element can be a cylindrical glass capillary (e.g., a glass capillary about 30 mm in length with an outer diameter of about 1.5 mm and an inner diameter ranging from about 0.8 mm to about 1.2 mm.) The dispensing end (180) of dispenser element (120) extends a distance from the external end (160) of axial bore (130), ranging from about 2.5 mm to 8 mm. In a preferred embodiment the dispenser end (180) is approximately 1.5 mm from ground plate (210). Selection of the diameter of small aperture (185) influences the size and, hence surface area to volume ratio, of the droplets generated by the charted droplet source. Smaller aperture sizes result in formation of smaller droplets with a larger surface area to volume ratio and larger aperture sizes result in formation of larger droplets with a smaller surface area to volume ratio. While it is desirable to have the aperture a small as possible to generate small droplets, it has been found in some applications to be preferably to have the aperture diameter to be about 20 microns or greater, because it minimizes clogging and the consequent frequent cleanings. In certain preferred embodiments, the dispenser element and small aperture are components in a microfabricated delivery system. In such embodiments, the dispenser element may have substantially the same diameter as small aperture (185).

Liquid sample may be introduced into dispenser element (120) by any known method but the use of aspiration or positive pressure filling from inlet end (170) is preferred. In an exemplary embodiment, the dispenser element has a dead volume of about 5 microliters. However, by backing the sample with solvent (i.e. first drawing solvent into the dispenser) sample volumes in the sub-microliter range may be analyzed. Sample solution is aspirated into the pulsed nanoelectrospray source by immersing the dispensing end of the tip in the sample solution and pulling a vacuum on a syringe connected to the back end.

A liquid sample to be analyzed may be directly introduced into the dispensing element or it may be introduced through a online liquid phase separation device. Any liquid phase separation device can be employed in such a device configuration. For example, on-line separation may include one or more of the following: a high performance liquid chromatography device; a capillary electrophoresis device; a microfiltration device; a liquid phase chromatography device; a flow sorting apparatus; or a super critical fluid chromatography device. Those of ordinary skill in the art can select one or more liquid phase separation devices to provide for appropriate sample purification or preparation dependent upon the type of sample and the type of chemical species that are to be analyzed prior to introduction of a liquid sample into the charged droplet source of this invention. Samples, including biological samples (tissue homogenates, cell homogenates, cell lysates, serum, cell growth medium, and the like) can be concentrated, diluted or separated as needed or desired prior to introduction into the charged droplet source of this invention. Liquid samples may be prepared in aqueous medium (including water) or any appropriate organic medium.

Figure 3A:
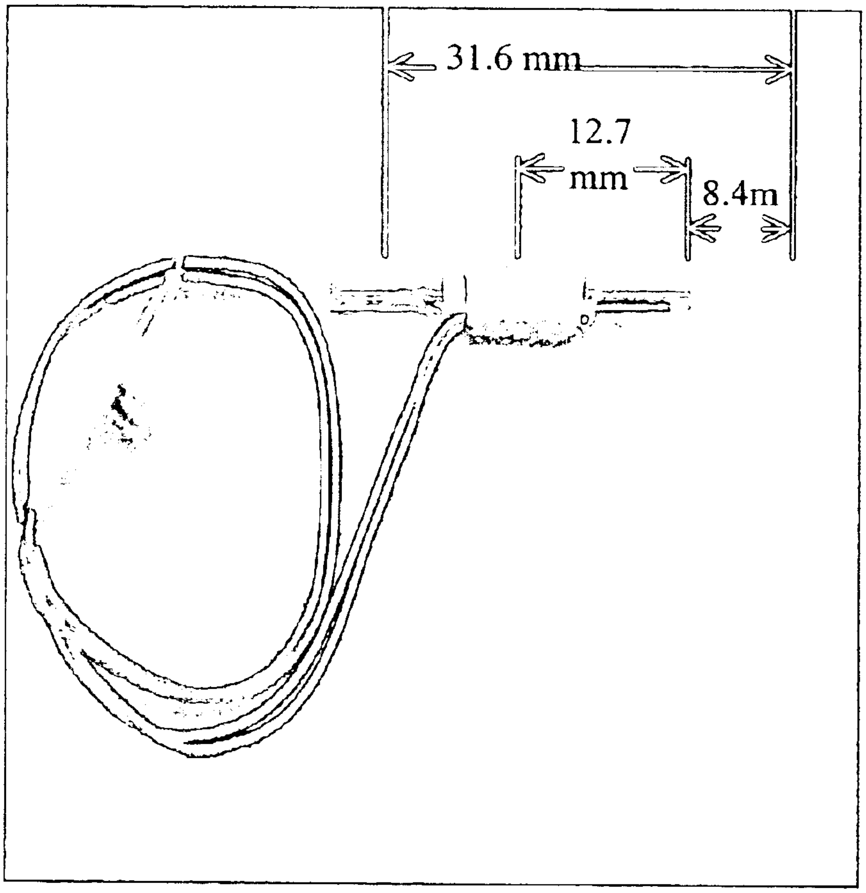
FIG. 3A displays a photograph of the droplet source of the present invention.
Figure 3B:
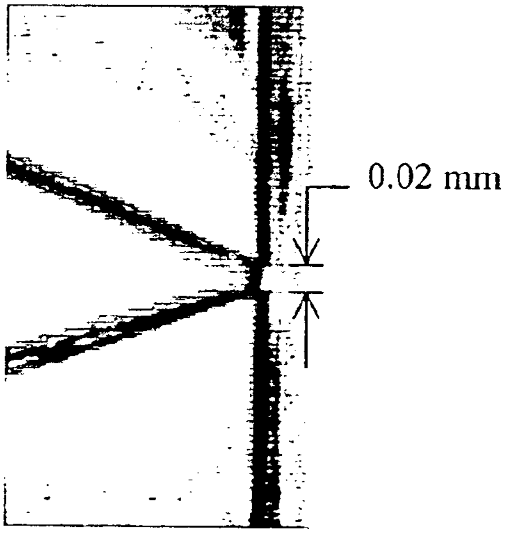
FIG. 3B is a magnified photograph of the dispensing end of the dispenser element. Exemplary dimensions for device elements are given.

FIG. 3A displays a photograph of a droplet source like that of FIG. 2 illustrating the electrical connections of the piezoelectric transducer to its controller and FIG. 3B is a magnified photograph of the dispensing end of the dispenser element.

Figure 4:
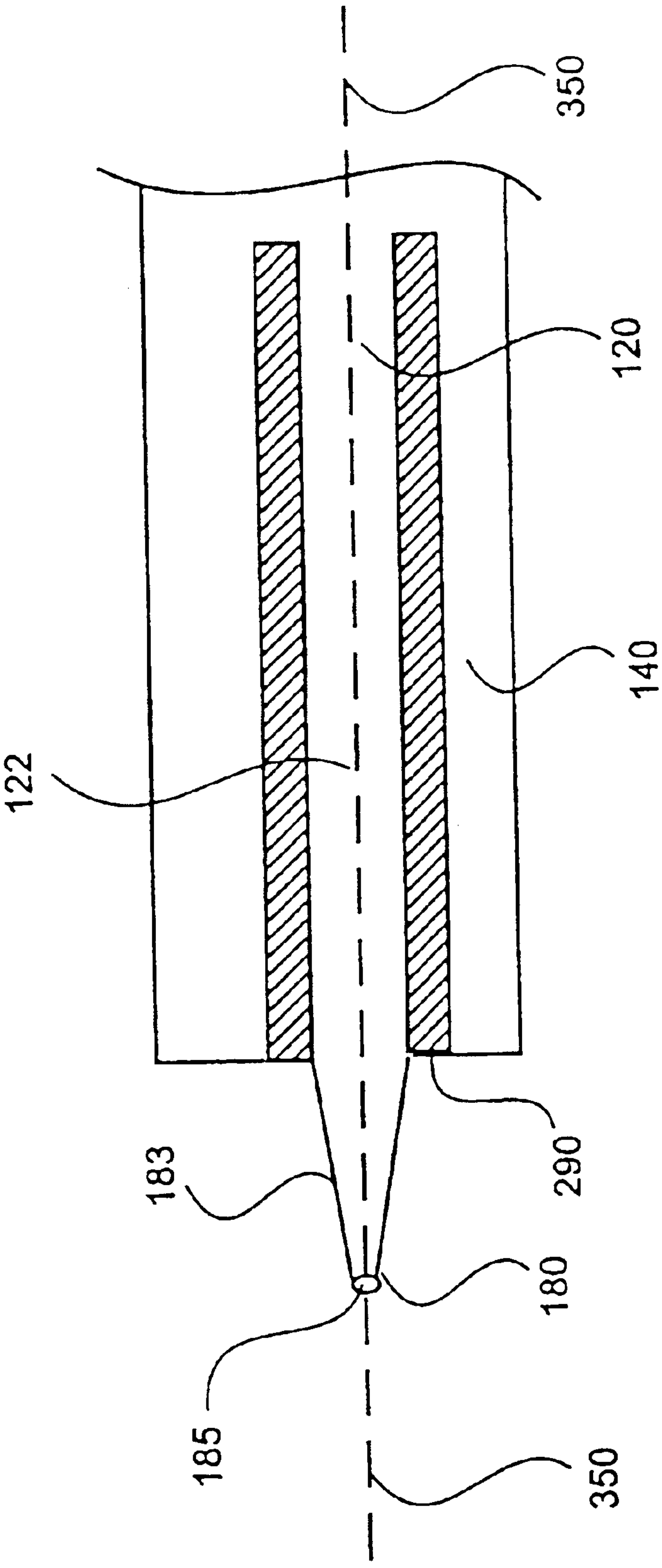
FIG. 4 shows the dispensing end of the dispenser element used in the charged droplet source of the present invention.

FIG. 4 illustrates an enlarged schematic of the dispenser end (180) of the dispenser element positioned in the axial bore (130) of the piezoelectric element (140). The dispenser end of the dispenser element is tapered (183) and terminates at aperture (185). To produce smaller charged droplets, a more gradual taper is preferred. The dispenser end is preferably ground and optically polished to produce a flat surface normal to the aperture opening. As apparent to anyone of ordinary skill in the art, a ground and polished tapered capillary is just one type of dispenser element useable in the present invention. Accordingly, the scope of the present invention encompasses other geometries and types of dispenser elements and apertures known in the art.

To generate charged droplets, a voltage is first applied to the electrode (220) in electrical contact with liquid sample (125), which holds the liquid sample at a high potential relative to ground plate (210). This establishes an electric field that results in a migration of ions (same polarity as the voltage on the platinum wire) to the dispensing end of the dispenser tip. A pulsed electric potential is then applied between the two contacts of the piezoelectric element (140) causing it to generate a radially contracting pressure wave within axial bore (130). This pulsed pressure wave is transmitted through the dispenser element (120) and creates a shock wave in the liquid sample. The resulting pressure fluctuation ejects solution in the form of a single charged droplet or an elongated stream of charged droplets from aperture (185).

The solution ejected at the aperture as droplets carries excess charge due to the migration of the ions in the bulk sample solution. Charged droplets exit the dispensing end into a flow of bath gas (340) and have a momentum substantially directed along droplet production axis (350). Bath gas is introduced via at least one flow inlet (not shown) at a flow rate preferably ranging from about 1 L/min to about 10 L/min along the droplet production axis. The flow rate of bath gas is controlled by a flow controller (not shown). The use of such flow controllers is well known in the art.

The piezoelectric dispenser is driven by a piezoelectric controller (230). In a preferred embodiment, the piezoelectric controller is obtained from Engineering Arts (Mercer Island, Wash.). This control unit controls the voltage applied to the piezoelectric elements and preferably allows adjustment of the width, amplitude, rise time, and fall time of the voltage pulse sent to the piezoelectric element. These parameters all influence the droplet formation process. Tuning of these parameters is important for the stable dispensing of a fixed sample volume per voltage pulse applied to the dispenser tip. Preferred temporal settings of the voltage pulse are about 1 to about 30 microseconds for the pulse duration, about 0 to about 40 microseconds for the pulse rise time and about 0 to about 40 microseconds for the pulse fall time. More preferred temporal settings of the voltage pulse are about 10 to about 20 microseconds for the pulse duration, about 0 to about 10 microseconds for the pulse rise time and about 20 to about 30 microseconds for the pulse fall time. In a preferred embodiment, the amplitude of the voltage pulse ranges from about 10 to about 75 volts. In a more preferred embodiment, the amplitude of the voltage pulse ranges from about 30 to about 40 volts. The piezoelectric controller can be controlled via a personal computer (280) or related processor. Methods of controlling the amplitude and temporal characteristic of the pulsed electric potential are well known in the art.

A preferred embodiment of the droplet source of the present invention may be prepared using the following method. A dispenser element may be made from glass tubing. The glass tubing (World Precision Instruments, Sarasota, Fla.), originally 1.5 millimeters outer diameter by 0.8 millimeters inner diameter, is held vertically with one end over a Bunsen burner flame and rotated with the aid of an electric drill motor (100–200 rpm). This causes the capillary to constrict and eventually close off. The end result is a complete narrowing of the inner diameter while leaving the outer diameter nearly unchanged. This produces a dispensing tip that is very robust, especially when compared to pulled capillaries. The length of the tubing inserted into the flame influences the shape of the inner diameter taper. For a short quick taper only a few millimeters of the capillary end is heated. For a more gradual taper, 10–15 millimeters of the tubing is heated. The gradual taper was found to produce smaller droplets. The flame polished glass tubes are then ground and optically polished to produce a flat surface normal to the aperture opening. In a preferred embodiment, grinding and polishing is accomplished through the use of a Buhler Ecomet 3 variable speed grinder-polisher (Lake Bluff, Ill.) that has been fitted with a custom holding fixture that allows the capillary to be rotated around its central axis while being held normal to the polishing surface. Initial grinding is performed on a wetted 600 grit grinding disc (Buhler) and progressed with successively finer grit down to a 3 micron aluminum oxide abrasive film disc (South Bay Technology, San Clemente, Calif.). The flame polishing produces a tapered inner diameter, thus the extent of grinding determines the size of the aperture, and it is necessary to microscopically monitor this process. A ground, polished, and cleaned glass tube of the desired aperture can then be bonded by epoxy into the piezoelectric cylinder. For example, the dispenser element can be bonded into the axial bore of piezoelectric element by filling the void between the two elements. The epoxy layer should provide for a good mechanical interface between the piezoelectric element and the dispenser element allowing efficient transfer of the shockwave created by the piezoelectric element to the dispenser element.

Figure 5A:
FIGS. 5A and 5B show photographs of the two stable modes of operation of the charged droplet source of the present invention.
Figure 5B:
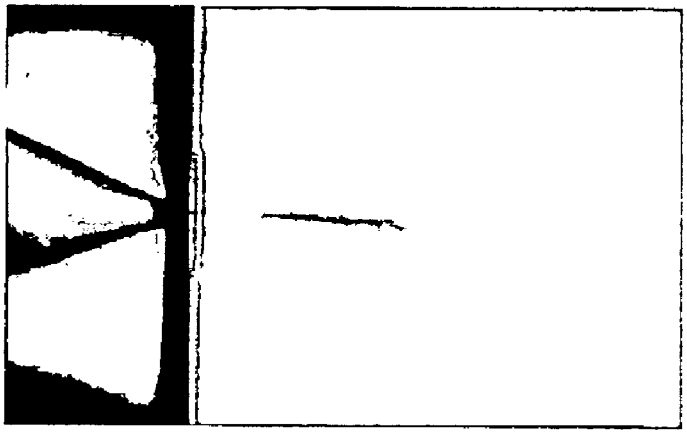

The droplet source of the present invention has been observed to dispense charged droplets in two modes: (1) discrete droplet mode in which single droplets are ejected per each pulsed electric potential applied to the piezoelectric element and (2) pulsed-stream mode in which an elongated stream of small droplets is produced for each pulsed electric potential applied to the piezoelectric element. The mode in which the liquid sample is ejected from the dispenser element can be changed by adjusting the shape or amplitude of the voltage pulse applied to the piezoelectric element. Two stable sample ejection modes are shown in FIGS. 5A and 5B. In FIG. 5A single droplets (shown by arrow) are formed. In FIG. 5B, a small stream of droplets is formed that quickly breaks apart into a series of smaller droplets (shown by arrows). The two different dispensing modes were obtained by changing the amplitude of the applied pulse to the dispenser (in the example shown, increasing the pulse amplitude from 20 V to 35 V changes the form of the dispensed solution from a single droplet to a stream). The amount of sample dispensed per pulse was 10 picoliters for the discrete droplet mode and 35 pl for the pulsed-stream mode. The output of the droplet source in both modes was evaluated by sampling gas phase analyte ions formed upon dispensing a 5 $\mu$M insulin sample with a conventional orthogonal time-of-flight mass spectrometer. Even though the dispensed volume only increased by a factor of 3.5 in the stream mode, the observed signal increased by a nearly a factor of 12. This observation is consistent with the current understanding of field desorption mechanisms. The smaller droplets, generated by breakup of the pulsed stream, have a higher surface-to-volume ratio, which makes a larger proportion of the analyte molecules available for desorption into the gas phase.

The mode in which the sample solutions are ejected from the dispenser element, either discrete droplet mode or pulsed-stream mode, may also be changed by adjusting the solution conditions of the liquid sample dispensed. For example, increasing the percentage of methanol in the liquid sample has been shown to affect the mode of the solution dispensation. Specifically, as the percentage of methanol in the liquid sample is increased the mode of the dispensation changes from single-droplet mode to pulsed-stream mode.

As discussed above and illustrated in FIG. 1B, the charged droplet sources of the present invention may be used to generate gas phase analyte ions from chemical species in a liquid sample. In a preferred embodiment, the field desorption region is a field desorption chamber operationally connected to the charged droplet source. In another preferred embodiment, the charged droplet source and the field desorption chamber are separated by the ground plate (210, as also illustrated in FIG. 2) held substantially close to ground and having a central orifice (211) through which the charged droplets can pass. In a preferred embodiment, the gas phase analyte ions generated have a momentum substantially directed along the droplet production axis (350).

In a preferred embodiment, gas phase analyte ions are generated via the following process. Upon formation, charged droplets with a momentum substantially directed along a droplet production axis are entrained into a stream of bath gas flowing (340) through at least one flow inlet and conducted through the field desorption region by a flow of bath gas. The flow of bath gas is adjustable by a flow rate controller operationally connected to the flow inlet. In a preferred embodiment, the flow of bath gas ranges from 1 to about 10 L/min. The flow of bath gas promotes evaporation or desolvation of solvent and/or carrier liquid from the charged droplets. Optionally, the field desorption region may be heated to aid in the evaporation or desolvation of solvent and/or carrier liquid from the droplets. As a consequence of at least partial evaporation or desolvation of solvent and/or carrier liquid, the charged droplets generate gas phase analyte ions. In a preferred embodiment, the gas phase analyte ions generated have a momentum substantially directed along the droplet production axis. The gas phase analyte ions are characterized by a charge state distribution. In a preferred embodiment of the present invention, the charged state distribution of the gas phase analyte ions is centered around a low charge state that is not sufficiently high to substantially cause spontaneous fragmentation of the gas phase analyte ions. In another preferred embodiment, the charge state distribution of the gas phase analyte ions reflect a uniform charge state.

Similar to the charged droplets, the gas phase analyte ions formed possess a momentum substantially directed along the droplet production axis. In a preferred embodiment, the gas phase analyte ions have a substantially uniform trajectory along the droplet production axis. In a more preferred embodiment, gas phase analyte ions do not deviate substantially from this uniform trajectory.

In a preferred embodiment, individual gas phase analyte ions are generated separately and sequentially in a flow of bath gas. In this embodiment, solution composition is chosen such that each droplet contains only one analyte molecule in a solvent, carrier liquid or both. As each charged droplet is formed in droplet source 100 via a separate radially contracting pressure wave, each droplet has a corresponding unique droplet exit time. The charged droplet output in this embodiment is conducted through the field desorption region. Upon evaporation in the field desorption region, a gas phase analyte ion is produce from one charged droplet introduced into the field desportion region. In a more preferred embodiment, a repetition rate of the charge droplet source is selected such that it provides, after desportion, a stream of individual gas phase analyte ions that are spatially separated from one another such that the individual analyte ions do not substantially exert forces on each other due to mutual charge repulsion. Minimizing mutual charge repulsion between gas phase analyte ions is beneficial because is preserves the well-defined trajectory of each analyte ion along the droplet production axis.

In a preferred embodiment, individual gas phase analyte ions are generated separately and sequentially in a flow of bath gas. In this embodiment, solution composition is chosen such that each droplet contains only one analyte molecule in a solvent, carrier liquid or both. As each charged droplet is formed in droplet source 100 via a separate radially contracting pressure wave, each droplet has a corresponding unique droplet exit time. The charged droplet output in this embodiment is conducted through the field desorption region. Upon evaporation in the field desorption region, a gas phase analyte ion is produce from one charged droplet introduced into the field desorption region. In a more preferred embodiment, a repetition rate of the charged droplet source is selected such that it provides, after desorption, a stream of individual gas phase analyte ions that are spatially separated from one another such that the individual analyte ions do not substantially exert forces on each other due to mutual charge repulsion. Minimizing mutual charge repulsion between gas phase analyte ions is beneficial because is preserves the well-defined trajectory of each analyte ion along the droplet production axis.

Gas phase analyte ions of the present invention are generated upon at least partial evaporation of solvent, carrier liquid or both from the charged droplets. In a preferred embodiment, the droplets undergo complete evaporation or desolvation prior to gas phase analyte ion production. This embodiment, is preferred because ion formation upon complete evaporation or desolvation is believed to yield gas phase analyte ions with substantially the same trajectories of the charged droplets from which they are generated.

In another preferred embodiment, the field desorption region is substantially free from electric fields, electromagnetic fields or both generated from sources other than the electrically charged droplet and gas phase analyte ion. In a preferred embodiment, the field desorption region is substantially free from electric fields generated by the charged droplet source. Minimizing the presence of electric fields in the field desorption region is beneficial to prevent deflection of the well-defined trajectories of the gas phase analyte ions generated.

As discussed above, the droplet sources of the present invention may be used to classify and detect chemical species in a solvent, carrier liquid or both present in a liquid sample as illustrated schematically in FIG. 1C where the droplet source and field adsorption region are operationally connected to a charge particle analyzer (400).

Figure 6:
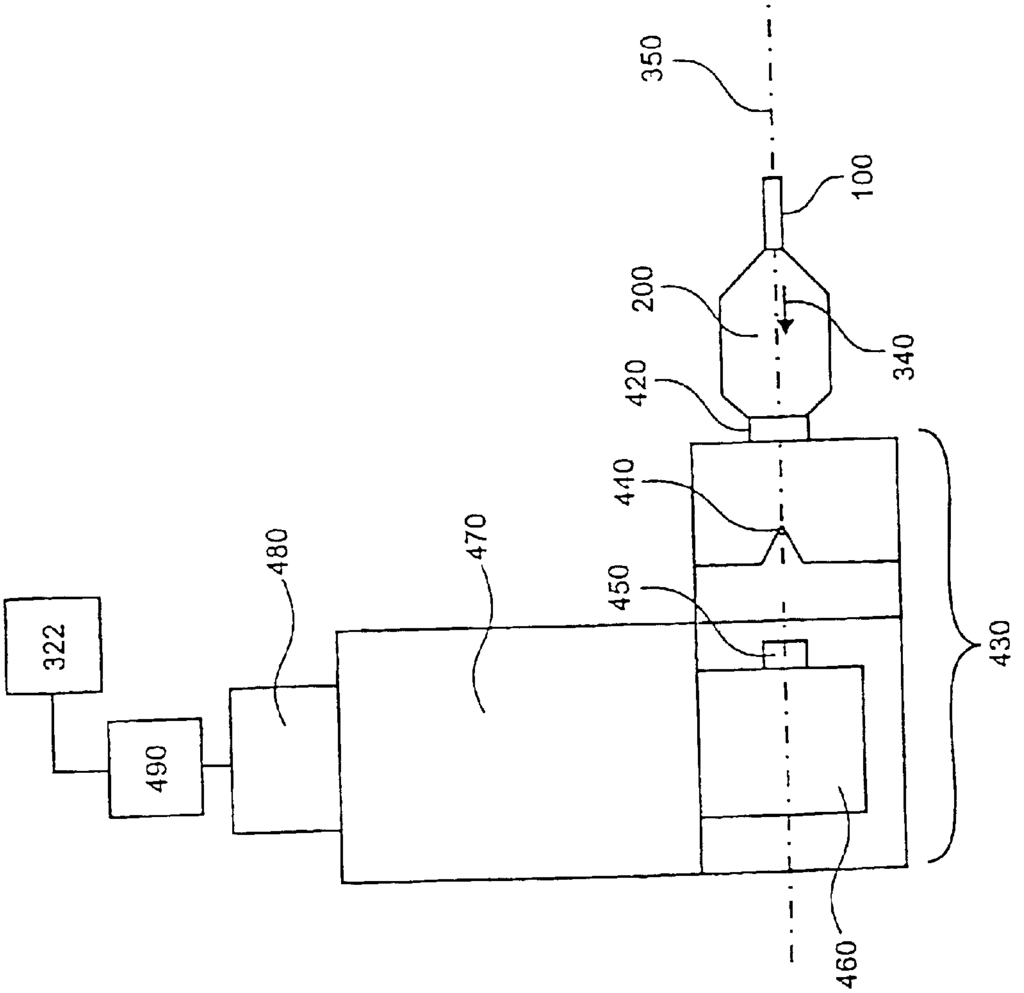
FIG. 6 is a schematic drawing of an ion source of the present invention coupled to an orthogonal time-of-flight mass spectrometer for determining the identity and concentration of chemical species in liquid samples.

FIG. 6 depicts a preferred embodiment of the device configuration of FIG. 1C in which droplets with a momentum substantially directed along droplet production axis (350) are generated via charged droplet source (100). The droplets are entrained in a flow of bath gas (340) and passed through field desorption chamber (200). At least partial evaporation of solvent, carrier liquid or both from charged droplets in the field desorption chamber generates gas phase analyte with a momentum substantially directed along the droplet production axis (350). The gas phase analyte ions exit the field desorption chamber through outlet (420) and are drawn into the entrance nozzle of an orthogonal time of flight mass spectrometer (430) held equipotential to the field desorption region. In a more preferred embodiment, the mass spectrometer is a commercially available PerSeptive Biosystems Mariner orthogonal TOF mass spectrometer. The orthogonal time of flight mass spectrometer is interfaced with the field desorption chamber through at least one skimmer orifice (440) that allows transport of gas phase analyte ions from atmospheric pressure to the higher vacuum ($<1\times10^{-3}$ Torr) region of the mass spectrometer. In a preferred embodiment, the nozzle of the mass spectrometer is held around 175° C. to ensure all particles entering the mass spectrometer are well dried.

The gas phase analyte ions are focused and expelled into a drift tube (470) by a series of ion optic elements (450) and pulsing electronics (460). The arrival of ions at the end of the drift tube is detected by a microchannel plate (MCP) detector 480. Although all gas phase ions receive the same kinetic energy upon entering the drift tube, they translate across the length of the drift tube with a velocity inversely proportional to their individual mass to charge ratios (m/z). Accordingly, the arrival times of singly charged gas phase analyte ions at the end of the drift tube are separated in time according to molecular mass. Accordingly, because the ion sources of this invention can generate an output substantially consisting of singly charged ions, they are highly compatible with ion detection and analysis by time of flight mass spectrometry. The output of micro-channel plate detector 480 is measured as a function of time by a 1.3 GHz time-to-digital converter 490 and stored for analysis by micro-computer 322. By techniques known in the art of time of flight mass spectrometry, flight times of gas phase analyte ions are converted to molecular mass using a calibrant of known molecular mass.

In a preferred embodiment of the present invention, droplet generation events are synchronized with the orthogonal extraction pulse of the TOF detector. In theory, perfect synchronization of droplet generation and extraction pulse allows a 100% duty cycle to be obtained. In the most preferred embodiment, the charged droplets generated have substantially uniform velocities and transmission trajectories through the field desorption region. Similarly, gas phase analyte ions formed from at least partial evaporation of the charged particles in the field desorption region also have substantially uniform velocities and transmission trajectories into the TOF analysis region. This preferred embodiment is desirable because it provides improved ion detection efficiency over conventional electrospray ionization mass spectrometry (ESI-MS) by at least a factor ranging from about 2 to about 20. Accordingly, the present invention comprises a method of analyzing liquid samples that consumes considerably less sample than convention ESI-MS analysis.

It should be recognized that the methods of ion production, classification, detection and quantitation employed in the present invention are not limited to ion analysis via TOF-MS and is readily adaptable to virtually any mass analyzer. Accordingly, any other means of determining the mass to charge ratio of the gas phase analyte ions may be substituted in the place of the time of flight mass spectrometer. Other applicable mass analyzers include, but are not limited to, quadrupole mass spectrometers, tandem mass spectrometers, ion traps and magnetic sector mass analyzers. However, an orthogonal TOF analyzer is preferred for the analysis of high molecular weight species because it is capable of measurement of m/z ratios over a very wide range that includes detection of singly charged ions up to approximately 30,000 Daltons. Accordingly, TOF detection is well suited for the analysis of ions prepared from liquid solution containing macromolecule analytes such as protein and nucleic acid samples.

It should also be recognized that the ion production method of the present invention may be utilized in sample identification and quantitative analysis applications employing charged particle analyzers other than mass analyzers. Ion sources of the present invention may also be used to prepare ions for analysis by electrophoretic mobility analyzers. In an exemplary embodiment, a differential mobility analyzer is operationally coupled to the field desorption region to provide analyte ion classification by electrophoretic mobility. In particular, such applications are beneficial because they allow ions of the same mass to be distinguished on the basis of their electrophoretic mobility.

Further, the devices and ion production methods of this invention may be used to prepare charged droplets, analyte molecules or both for coupling to surfaces and/or other target destinations. For example, surface deposition may be accomplished by positioning a suitable substrate downstream of the droplet source and/or field desorption region along the droplet production axis and in the pathway of the stream of charged droplets and/or gas phase analyte ions generated from the charged droplets. The substrate may be grounded or electrically biased whereby charged droplets and/or gas phase analyte ions are attracted to the substrate surface. In addition, the stream of charged droplets and/or gas phase ions may be directed, accelerated or decelerated using ion optics as is well-known by persons of ordinary skill in the art. Upon deposition, the substrate may be removed and analyzed via surface and/or bulk sensitive techniques such as atomic force microscopy, scanning tunneling microscopy or transmission electron microscopy. Similarly, the devices, charged droplet preparation methods and ion preparation methods of this invention may be used to introduce chemical species into cellular media. For example, charged oligopeptides and/or oligonucleotides prepared by the present methods may be directed toward cell surfaces, accelerated or decelerated and introduced in one or more target cells by ballistic techniques known to those of ordinary skill in the art.

The present invention provides a means of generating charged droplets and gas phase analyte ions, preferentially having a momentum substantially directed along a droplet production axis, from liquid solutions. In addition, the methods and devices of the present invention provide droplet sources and gas phase analyte ion sources with adjustable control over the charge state distributions of the droplets and/or gas phase analyte ions formed. The invention provides an exemplary ion source for the identification and quantification of high molecular weight chemical species containing in liquid samples via analysis with a mass analyzer or any equivalent charged particle analyzer. These and other variations of the present charged droplet and ion sources are within the spirit and scope of the claimed invention. Accordingly, it must be understood that the detailed description, preferred embodiments and drawings set forth here are intended as illustrative only and in no way represent a limitation on the scope and spirit of the invention.

EXAMPLES

Example 1: Analysis of Protein and DNA Containing Samples

The use of the ion source of the present invention for the detection and quantification of biopolymers was tested by analyzing liquid samples containing known quantities of protein and oligonucleotide analytes using an ion source of the present invention operationally connected to an orthogonal acceleration TOF-MS. The initial charged droplets were generated via the piezoelectric charged droplet source described above. The dispenser element of the charged droplet source was a glass capillary (0.5 mm inner diameter, 0.73 mm outer diameter) with one end drawn down to produce a 32 micron diameter exit aperture. The total length of the glass capillary was 17 mm. To increase the usable sample volume during initial implementation, an additional 3.2 cm length of tubing (1.8 mm inner diameter) was attached to the opposite end of the capillary. The sample solution was held at a high potential via a platinum electrode placed inside the extension tube (2000 V, which is ½ of the potential typically employed with conventional electrospray), causing the droplets produced to be highly charged. The charges caused subsequent droplet fissioning and eventually the production of gas phase analyte ions upon at least partial evaporation or desolvation of the droplet. Output of the ion source was conducted through the entrance nozzle of the Mariner Workstation. This provided sufficient time for the droplets to desolvate. Droplets were generated at a repetition rate of 50 Hz and sprayed directly at the nozzle entrance.

In contrast to the conditions employed for Rayleigh breakup of a liquid jet, no backpressure was applied to the sample. This is very different than the situation in conventional electrospray in that one can reduce the rate at which analyte ions are produced by reducing the rate at which charged droplets are produced with the piezoelectric dispenser. Observation of the droplets with a microscope using synchronized stroboscopic illumination (light pulses synchronized with the frequency of the droplet generation) revealed that the droplets were generated with a diameter of 30 μm and with good uniformity (±2 microns) from droplet to droplet.

Figure 7:
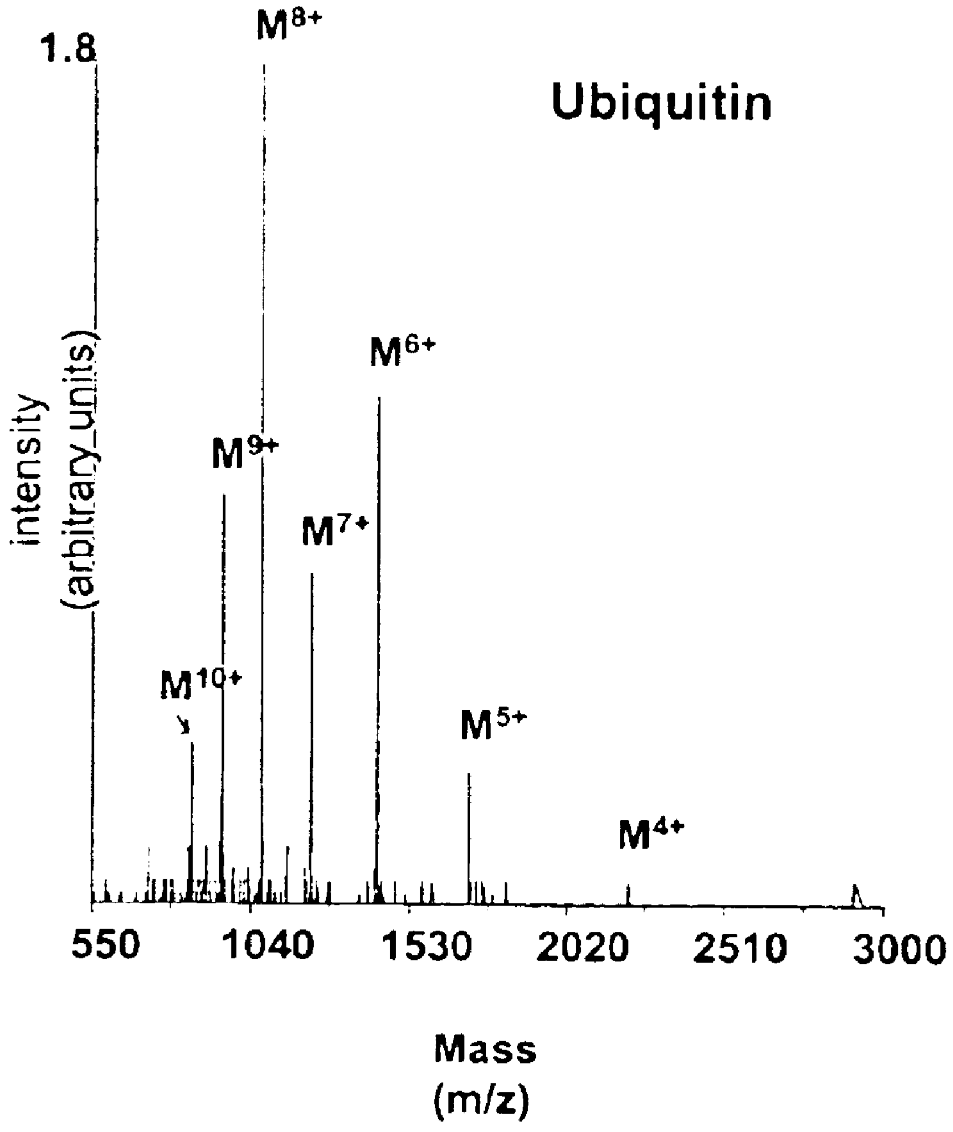
FIG. 7 illustrates the application of the present invention to the detection of protein analytes.

FIG. 7 shows a positive ion spectrum observed upon analysis of a sample containing bovine ubiquitin (8564.8 amu) at a concentration of 1 μM in 1:1 $H_2O$:acetonitrile, 1% acetic acid. The piezoelectric droplet source was operated at a frequency of 50 Hz, with a pulse amplitude of 65 V and a pulse width of 30 μs. The liquid sample was held at a potential difference of +4,500 V relative to the mass spectrometer. The spectrum in FIG. 7 was generated from 100 individual pulses of the piezoelectric element at a rate of 250 Hz. The spectrum was smoothed using a 98 point Gaussian smoothing alogorithm. The analysis consumed 2.8 nanoliters of the 1 μM sample or a total of 2.8 fmol of sample. As shown in FIG. 7, peaks directly attributable to ubiquitin in a variety of charged states are clearly apparent.

Figure 8:
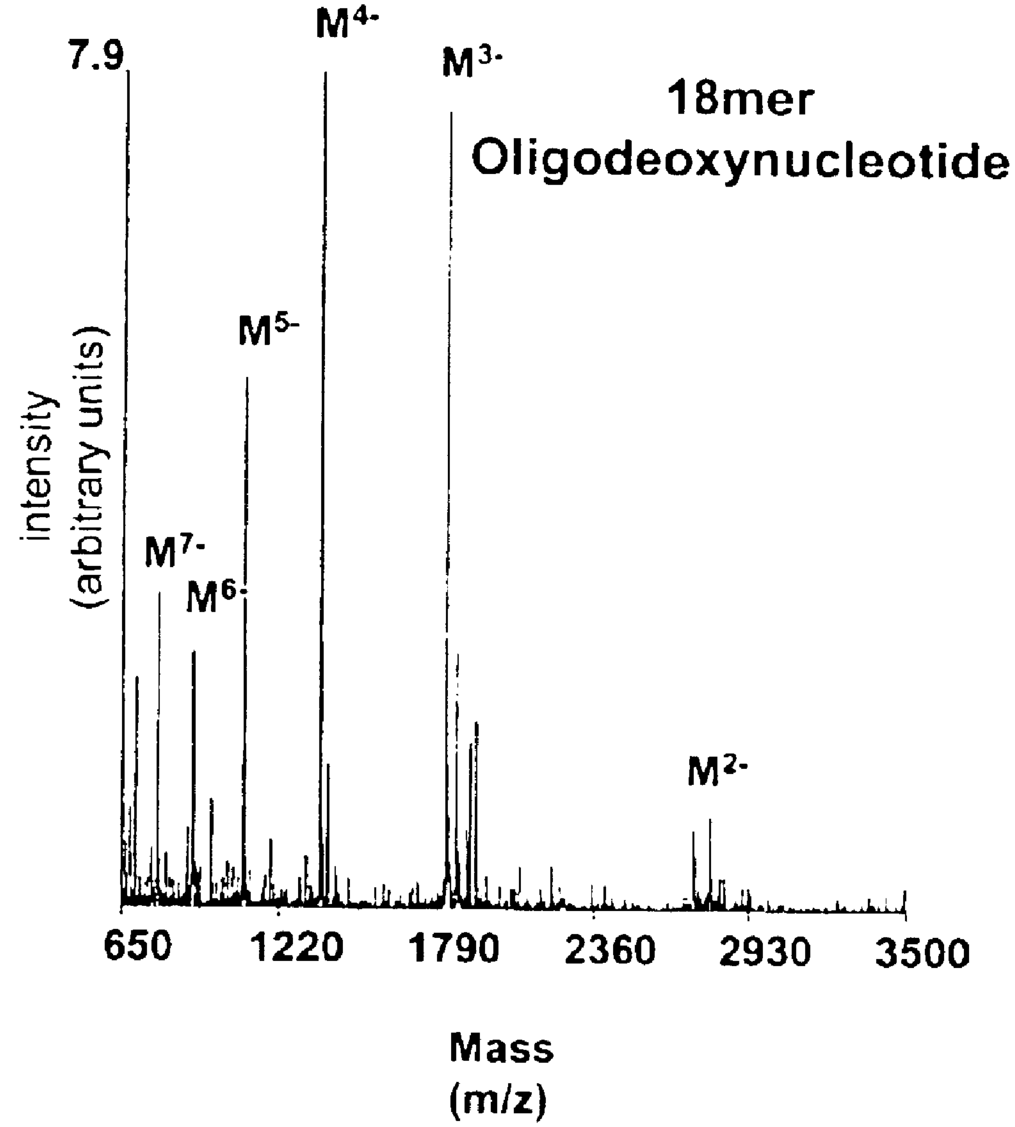
FIG. 8 illustrates the application of the present invention to the detection of oligonucleotide analytes.
Figure 9A:
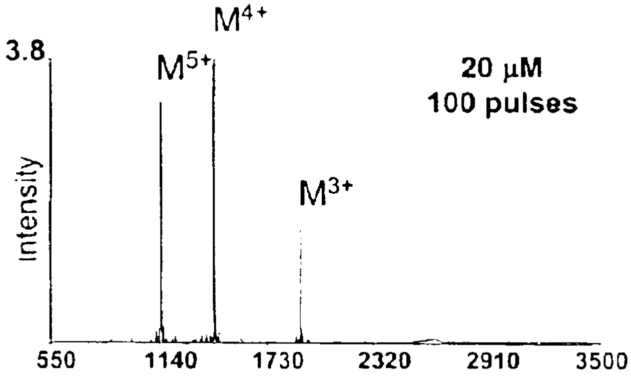
FIGS. 9A–D illustrates the effect of sample concentration on the mass spectra obtained using the charged droplet source of the present invention as sample solution of bovine insulin (mw=5734.6) was serially diluted over a concentration range of 20 μM to 0.0025 μM in a solution of 1:1 MeOH/$H_2O$, 1% acetic acid. The spectra in FIG. 9 reflect concentrations of bovine insulin of: (A) 20 μM, (B) 1 μM, (C) 0.5 μM and (D) 0.0025 μM and reflect signal averaging of: (A) 100 pulses, (B) 100 pulses, (C) 1000 pulses and (D) 20000 pulses.
Figure 9B:
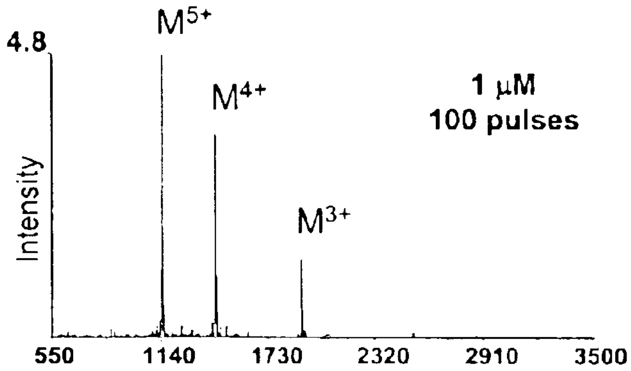
Figure 9C:
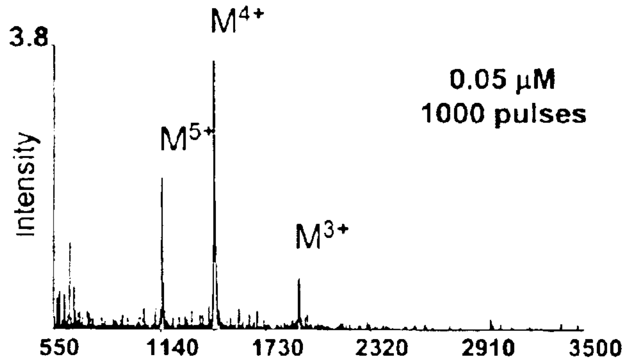
Figure 9D:
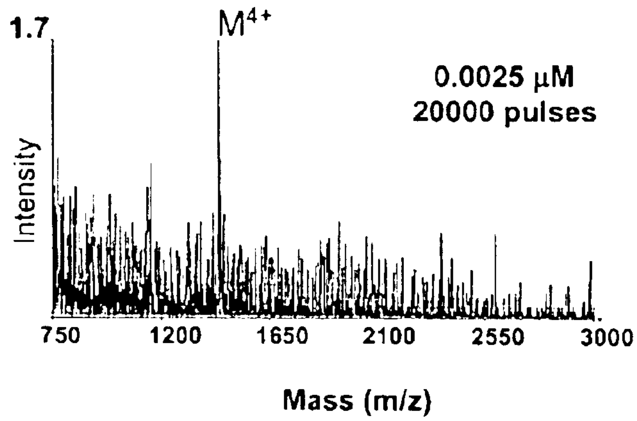

FIG. 8 shows a positive ion spectrum observed upon analysis of a sample containing a synthetic 18 mer oligonucleotide (SEQ ID NO:1) (ACTGGCCGTCGTTTTACA, 5464.6 amu) at a concentration of 5 μM in 1:1 $H_2O$:$CH_3OH$, 400 mM HFIP (maintained at a pH of 7). The piezoelectric droplet source was operated at a frequency of 50 Hz, with a pulse amplitude of 65 V and a pulse width of 30 μs. The liquid sample was held at a potential difference of −3000 V relative to the mass spectrometer. The spectrum in FIG. 8 was generated from 100 individual pulses of the piezoelectric element at a rate of 250 Hz. The spectrum was smoothed using a 98 point Gaussian smoothing alogorithm. As shown in FIG. 8, peaks directly attributable to the +2 and +3 charged state of this oligonucleotide are clearly a apparent.

FIGS. 9A–D illustrate the effect of sample concentration on the mass spectra obtained using the charged droplet source of the present invention. A sample solution of bovine insulin (mw=5734.6) was serially diluted over a concentration range of 20 μM to 0.0025 μM in a solution of 1:1 MeOH/$H_2O$, 1% acetic acid. The spectra in FIGS. 9A–D reflect concentrations of bovine insulin of: (A) 20 μM, (B) 1 μM, (C) 0.5 μM and (D) 0.0025 μM. Further, the spectra in FIGS. 9A–D were generated by signal averaging pulses and reflect average of: (A) 100 pulses, (B) 100 pulses, (C) 1000 pulses and (D) 20000 pulses. As shown in these spectra, varying the sample concentration from 20 μM to 1 μM has little effect on the observed signal intensities while reducing the sample concentration further from 1 μM to 0.0025 μM shows a continuous decrease in signal intensity with sample concentration.

Example 2: Single Particle Mass Spectrum

Figures 10A, 10B, 10C:
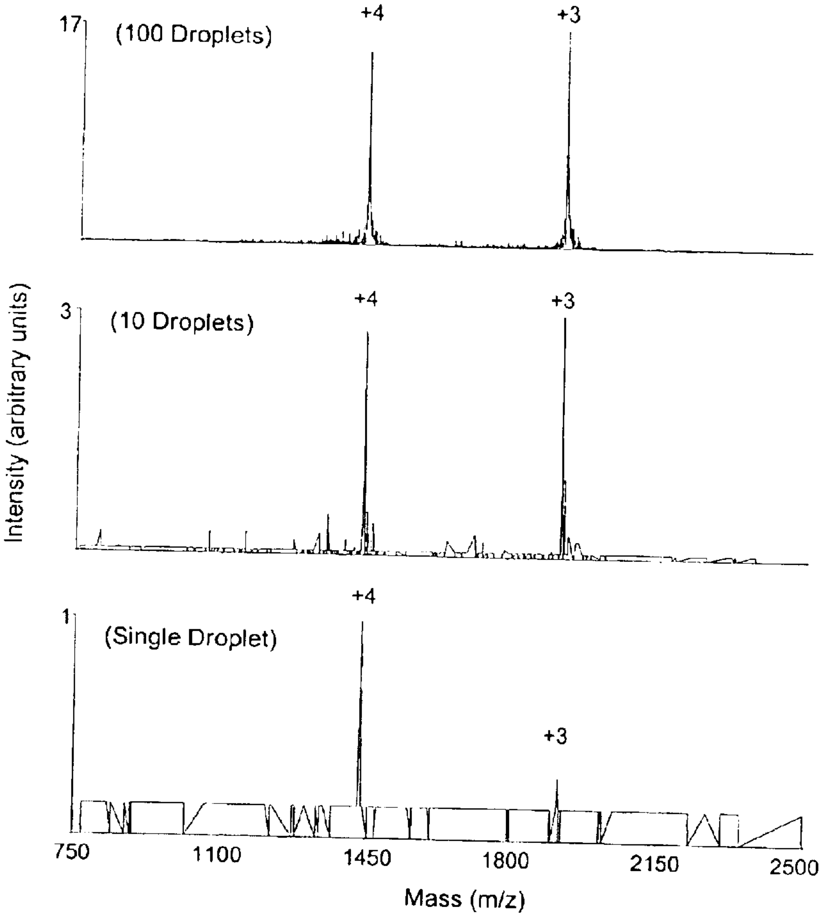
FIGS. 10A–C demonstrate the use of the present invention to generated a mass spectrum from a single charged droplet using orthogonal time of flight detection. In these experiments spectra of bovine insulin (5734.6 amu, 10 μM in 1:1 $H_2O$:$CH_3OH$ 1% acetic acid) were obtained for a range of droplet sampling conditions.
Figures 11A, 11B, 11C, 11D:
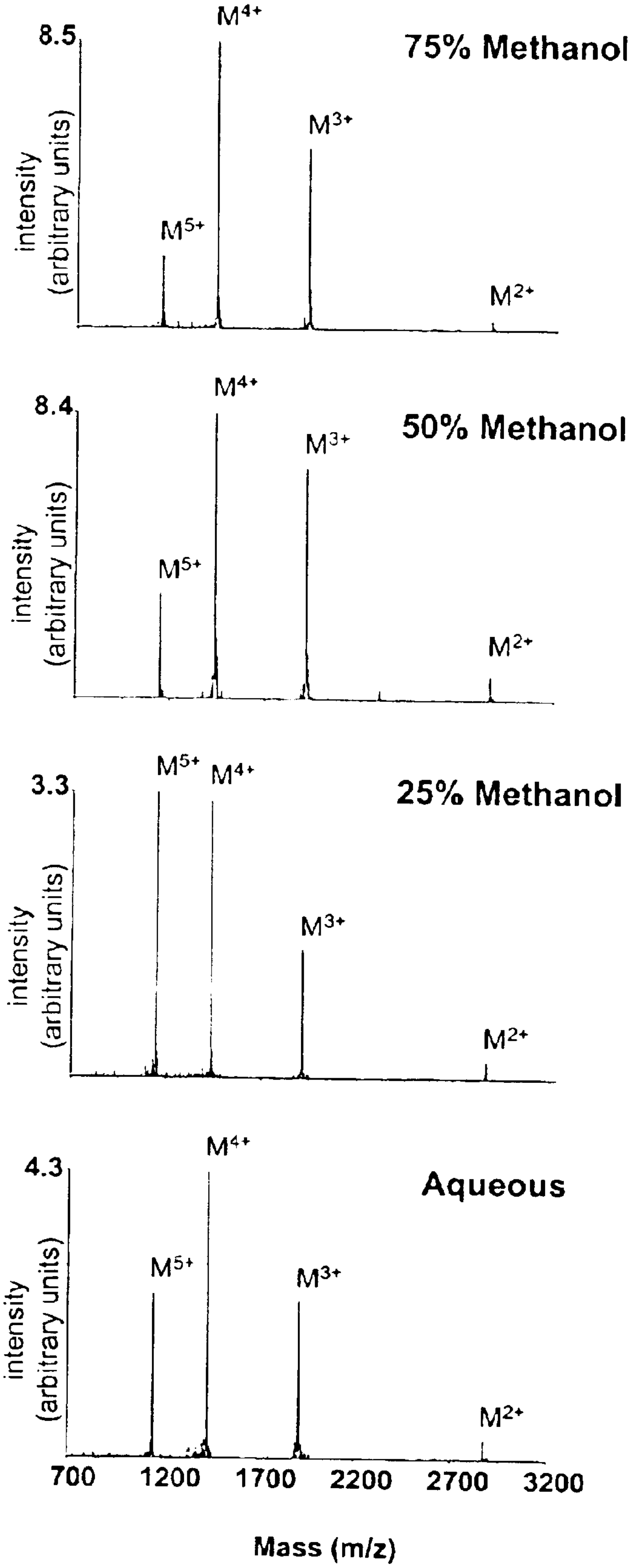
FIGS. 11A–D show the mass spectra observed over a range of solution compositions of the liquid sample analyzed. Specifically, FIGS. 11A–D display the mass spectra obtained from 100 pulses of a 5 μM insulin sample from each of 4 different solution compositions: (A) 75% MeOH in water, (B) 50% MeOH in water, (C) 25% MeOH in water and, (D) a straight aqueous solution; all sample solutions contained 1% acetic acid.

An ion source of the present invention has also been used to generated a mass spectrum from a single charged droplet using orthogonal time of flight detection. In these experiments spectra of bovine insulin (5734.6 amu, 10 μM in 1:1 $H_2O$:$CH_3OH$ 1% acetic acid) were obtained for a range of droplet sampling conditions. FIG. 10A displays the mass spectral analysis of 100 droplets, FIG. 10B displays the mass spectral analysis of 10 droplets and FIG. 10C displays the mass spectral analysis of a single droplet. The number of droplets generated for each spectrum was controlled using the piezoelectric charged droplet source of the present invention. Each droplet had a volume of approximately 100 picoliters calculated from the observed 30 micron droplet diameter. The piezoelectric source was operated at a frequency of 50 Hz, with a pulse amplitude of 65 V, and a pulse width of 30 μs. The spray voltage employed was 2500 V, in positive mode. As shown in FIGS. 10A–C, the +4 and +3 charged state of bovine insulin is observed in each spectrum. The results of these experiments demonstrate that mass spectra can be obtained for a single droplet containing chemical species using the droplet source of the present invention. This result demonstrates the feasibility of obtaining mass spectra corresponding to very small quantities of sample (approximately 10 picoliters).

Example 3: Variation of Solution Conditions of the Liquid Sample

The ion source of the present invention was evaluated for a range of solution compositions of the liquid sample analyzed. FIGS. 11A–D display the mass spectra obtained from 100 pulses of a 5 μM insulin sample from each of 4 different solution compositions, A) 75% MeOH in water, B) 50% MeOH in water, C) 25% MeOH in water and, D) a straight aqueous solution; all sample solutions contained 1% acetic acid. As shown in these spectra, the measured signal varied by less than three fold over this range. This application demonstrates the robustness and high degree of versatility of the droplet and ion sources of the present invention. The ability to analyze samples over a wide range of solution conditions is especially beneficial for the analysis of liquid samples containing biomolecules, such as proteins or nucleic acids, that are present in a specific physical and/or chemical state highly dependent on solution phase conditions.

Increasing the percent of methanol in the sample solution was also observed to affect the mode of the solution dispensation from the charged droplet source. Specifically, as the percentage of methanol in the liquid sample is increased the mode of the dispensation from the droplet source was observed to change from single-droplet mode to pulsed-stream mode.

All references cited in this application are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

c) an electrode in contact with said liquid sample for holding said liquid sample at a selected electric potential;

d) a shield element positioned between said electrode and said piezoelectric element for substantially preventing the electric field, electromagnetic field or both generated by said electrode from interacting with said piezoelectric element; and e) a piezoelectric controller operationally connected to said piezoelectric element capable of adjusting the onset time, frequency, amplitude, rise time, fall time and duration of the pulsed electric potential applied to the piezoelectric element which selects the onset time, frequency, amplitude, rise time, fall times, duration or any combination of these of the pulsed pressure wave within the axial bore.

2. The charged droplet source of claim 1 wherein the charged droplets have a momentum substantially directed along the droplet production axis.

3. The charged droplet source of claim 1 wherein the dispenser element is the shield element.

4. The charged droplet source of claim 1 comprising at least one bath gas inlet in fluid communication with said dispenser element for introducing a flow of bath gas.

5. The charged droplet source of claim 1 wherein the dispenser element is bonded into said axial bore.

6. The charged droplet source of claim 1 wherein the dispenser element is removable.

We claim:

1. A charged droplet source for preparing electrically charged droplets from a liquid sample, said source comprising:

a) a piezoelectric element with an axial bore, positioned along a droplet production axis, having an internal end and an external end, wherein said piezoelectric element generates a pulsed pressure wave within the axial bore upon application of a pulsed electric potential to the piezoelectric element;

b) a dispenser element positioned within the axial bore of said piezoelectric element, wherein the dispenser element extends a selected distance past the external end of the axial bore and terminates at a dispensing end with an aperture, wherein the dispenser element extends a selected distance past the internal end of the axial bore and terminates at an inlet end for introducing liquid sample and wherein said pulsed pressure wave is conveyed through said dispenser element and generates electrically charged droplets of the liquid sample that exit the dispensing end at a selected droplet exit time;

7. The charged droplet source of claim 1 wherein the pulsed pressure wave is a pulsed radially contracting pressure wave.

8. The charged droplet source of claim 1 wherein the aperture of said dispensing end has a diameter of about 20 microns.

9. The charged droplet source of claim 1 wherein the dispenser element is a glass capillary.

10. The charged droplet source of claim 1 wherein the dispenser element has an inner diameter ranging from about 0.1 to about 1 millimeters.

11. The charged droplet source of claim 1 wherein the dispenser element has an outer diameter ranging from about 0.5 to about 1.5 millimeters.

12. The charged droplet source of claim 1 wherein the piezoelectric element is cylindrical.

13. The charged droplet source of claim 1 wherein the axial bore of said piezoelectric element has an inner diameter ranging from about 0.5 millimeters to about 10 millimeters.

14. The charged droplet source of claim 1 wherein the axial bore of said piezoelectric element has an outer diameter ranging from about 1.0 millimeters to about 20 millimeters.

15. The charged droplet source of claim 1 wherein the distance that the dispenser element extends past the external end of the axial bore is selectably adjustable and ranges from about 1 millimeters to about 10 millimeters.

16. The charged droplet source of claim 1 wherein the droplets have a selectively adjustable diameter ranging from about 1 micron to about 50 microns.

17. The charged droplet source of claim 1 wherein the droplets have a substantially uniform diameter.

18. The charged droplet source of claim 1 wherein said electrode is a platinum electrode.

19. The charged droplet source of claim 1 wherein the liquid sample is held at a selected electric potential ranging from about −5,000 volts to about +5,000 volts.

20. The charged droplet source of claim 1 wherein the liquid sample contains chemical species in a solvent, carrier liquid or both.

21. The charged droplet source of claim 20 wherein said chemical species are polymers.

22. The charged droplet source of claim 20 wherein said chemical species are selected from the group consisting of:

one or more oligopeptides;

one or more oligonucleotides;

one or more protein—protein aggregate complexes;

one or more protein-DNA aggregate complexes;

one or more protein-lipid aggregate complexes; and one or more carbohydrates.

23. The charged droplet source of claim 20 wherein each droplet contains a single chemical species.

24. The charged droplet source of claim 20 wherein each droplet contains a plurality chemical species.

25. The charged droplet source of claim 1 wherein the electrically charged droplets are positively charged.

26. The charged droplet source of claim 1 wherein the electrically charged droplets are negatively charged.

27. The charged droplet source of claim 1 wherein the shield element comprises a glass sheath substantially surrounding said electrode.

28. The charged droplet source of claim 20 wherein the concentration of said chemical species in said liquid sample is less than or equal to about 20 picomoles per liter.

29. The charged droplet source of claim 1 wherein the duration, frequency, amplitude, rise time, fall time of the pulsed pressure wave or any combinations thereof are adjusted to control the droplet exit time, repetition rate and size of the droplets generated.

30. The charged droplet source of claim 1 wherein the piezoelectric controller comprises a voltage source that is adjustable to select the electric potential applied to said piezoelectric element.

31. The charged droplet source of claim 1 wherein the liquid sample is aspirated into the dispenser element.

32. The charged droplet source of claim 1 wherein the liquid sample is introduced to the dispenser element by application of a positive pressure.

33. The charged droplet source of claim 1 wherein a electrically charged single droplet is generated upon each application of the pulsed electric potential.

34. The charged droplet source of claim 1 wherein a discrete elongated stream of electrically charged droplets is generated upon each application of the pulsed electric potential.

35. The charged droplet source of claim 1 comprising an online liquid phase separation device operationally connected to said dispenser element to provide sample purification, separation or both prior to formation of said electrically charged droplets.

36. The charged droplet source of claim 35 wherein said online liquid phase separation device is selected from the group consisting of:

a high performance liquid chromatography device;

a capillary electrophoresis device;

a microfiltration device;

a liquid phase chromatography device;

flow sorting apparatus; and a super critical fluid chromatography device.

37. The charged droplet source of claim 1 wherein the charge state distribution of said electrically charged droplets is selectively adjustable by selecting the electric potential applied to the liquid sample.

38. The charged droplet source of claim 1 wherein the piezoelectric element is composed of PZT-5A.

39. An ion source for preparing gas phase analyte ions from a liquid sample, containing chemical species in a solvent carrier liquid or both, said source comprising;

a) a piezoelectric element with an axial bore, positioned along the a droplet production axis, having an internal end and an external end, wherein said piezoelectric element generates a pulsed pressure wave within the axial bore upon application of a pulsed electric potential to the piezoelectric element;

b) a dispenser element positioned within the axial bore of said piezoelectric element, wherein the dispenser element extends a selected distance past the external end of the axial bore and terminates at a dispensing end with a small aperture opening, wherein the dispenser element extends a selected distance past the internal end of the axial bore and terminates at an inlet end for introducing liquid sample and wherein said pulsed pressure wave is conveyed through said dispenser element and generates electrically charged droplets of the liquid sample that exit the dispensing end at a selected droplet exit time and travel along a droplet production axis;

c) an electrode in contact with said liquid sample for holding said liquid sample at a selected electric potential;

d) a shield element positioned between said electrode and said piezoelectric element for substantially preventing the electric field, electromagnetic field or both generated by said electrode from interacting with said piezoelectric element; and e) a piezoelectric controller operationally connected to said piezoelectric element capable of adjusting the onset time, frequency, amplitude, rise time, fall time and duration of the pulsed electric potential applied to the piezoelectric element which selects the onset time, frequency, amplitude, rise time, fall times, duration or any combination of these of the pulsed pressure wave within the axial bore; and f) a field desorption region of selected length positioned along said droplet production axis at a selected distance downstream from said piezoelectric element, with respect to the flow of bath, for receiving the flow of bath gas and electrically charged droplets, wherein at least partial evaporation of solvent, carrier liquid or both from the droplets generates gas phase analyte ions and wherein the electrically charged droplets, analyte ions or both remain in the field desorption region for a selected residence time.

40. The ion source of claim 39 wherein the charged state distribution of said gas phase analyte ions is selectively adjustable by selecting the electric potential applied to the liquid sample.

41. The ion source of claim 39 wherein said gas phase analyte ions have a momentum substantially directed along the droplet production axis.

42. The ion source of claim 39 wherein a single gas phase ion is generated from each charged droplet.

43. The ion source of claim 39 wherein a plurality of gas phase ions is generated from each charged droplet.

44. The ion source of claim 39 comprising a field desorption—charge reduction region.

45. A device for determining the identity, concentration or both of chemical species in a liquid sample containing the chemical species in a solvent, carrier liquid or both, said device comprising:

a) a piezoelectric element with an axial bore, positioned along the a droplet production axis, having an internal end and an external end, wherein said piezoelectric element generates a pulsed pressure wave within the axial bore upon application of a pulsed electric potential to the piezoelectric element;

b) a dispenser element positioned within the axial bore of said piezoelectric element, wherein the dispenser element extends a selected distance past the external end of the axial bore and terminates at a dispensing end with a small aperture opening, wherein the dispenser element extends a selected distance past the internal end of the axial bore and terminates at an inlet end for introducing liquid sample and wherein said pulsed pressure wave is conveyed through said dispenser element and generates electrically charged droplets of the liquid sample that exit the dispensing end at a selected droplet exit time and travel along a droplet production axis;

c) an electrode in contact with said liquid sample for holding said liquid sample at a selected electric potential;

d) a shield element positioned between said electrode and said piezoelectric element for substantially preventing the electric field, electromagnetic field or both generated by said electrode from interacting with said piezoelectric element; and e) a piezoelectric controller operationally connected to said piezoelectric element capable of adjusting the onset time, frequency, amplitude, rise time, fall time and duration of the pulsed electric potential applied to the piezoelectric element which selects the onset time, frequency, amplitude, rise time, fall time, duration or any combination of these of the pulsed pressure wave within the axial bore;

f) a field desorption region of selected length positioned along said droplet production axis at a selected distance downstream from said piezoelectric element, with respect to the flow of bath, for receiving the flow of bath gas and electrically charged droplets, wherein at least partial evaporation of solvent, carrier liquid or both from the droplets generates gas phase analyte ions and wherein the electrically charged droplets, analyte ions or both remain in the field desorption region for a selected residence time; and g) a charged particle analyzer operationally connected to said field desorption region, for analyzing said gas phase analyte ions.

46. The device of claim 45 wherein the charged particle analyzer comprises a mass analyzer operationally connected to said field desorption region to provide efficient introduction of said gas phase analyte ions into said mass analyzer.

47. The device of claim 46 wherein said mass analyzer comprises a time-of-flight detector having a flight tube that is positioned coaxial with said droplet production axis.

48. The device of claim 46 wherein said mass analyzer comprises a time-of-flight detector having a flight tube that is positioned orthogonal to said droplet production axis.

49. The device of claim 46 wherein the mass analyzer is selected from the group consisting of:

a) an ion trap;

b) a quadrupole mass spectrometer;

c) a tandem mass spectrometer;

d) multiple stage mass spectrometer; and e) a residual gas analyzer.

50. The device of claim 45 wherein said charged particle analyzer comprises an instrument for determining electrophoretic mobility of said gas phase analyte ions.

51. The device of claim 50 wherein said instrument for determining electrophoretic mobility comprises a differential mobility analyzer.

52. A method of generating electrically charged droplets using the device of claim 1.

53. A method of determining the identity and concentration of chemical species in a liquid sample containing chemical species in a solvent, carrier liquid or both using the device of claim 45.

* * * * *

SEQUENCE LISTING

```
<160> NUMBER OF SEQ ID NOS: 1

<210> SEQ ID NO 1
<211> LENGTH: 18
<212> TYPE: DNA
<213> ORGANISM: Artificial Sequence
<220> FEATURE:
<223> OTHER INFORMATION: Description of Artificial Sequence:
      oligonucleotide used in demonstration of
      invention.

<400> SEQUENCE: 1

actggccgtc gttttaca                                              18
```